United States Patent
Byun

(10) Patent No.: US 10,990,539 B2
(45) Date of Patent: Apr. 27, 2021

(54) CONTROLLER, MEMORY SYSTEM INCLUDING THE SAME, AND METHOD OF OPERATING MEMORY SYSTEM

(71) Applicant: SK hynix Inc., Icheon (KR)

(72) Inventor: Eu Joon Byun, Yongin (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/533,562

(22) Filed: Aug. 6, 2019

(65) Prior Publication Data

US 2020/0320019 A1    Oct. 8, 2020

(30) Foreign Application Priority Data

Apr. 3, 2019 (KR) .................. 10-2019-0039117

(51) Int. Cl.
   *G06F 12/12* (2016.01)
   *G06F 12/10* (2016.01)
   *G06F 12/122* (2016.01)

(52) U.S. Cl.
   CPC ............ *G06F 12/122* (2013.01); *G06F 12/10* (2013.01); *G06F 2212/657* (2013.01)

(58) Field of Classification Search
   CPC ... G06F 12/10; G06F 12/122; G06F 2212/657
   USPC ........................................................ 711/103
   See application file for complete search history.

(56) References Cited

U.S. PATENT DOCUMENTS

| 8,601,202 B1 | 12/2013 | Melcher et al. |
| 2007/0260811 A1 | 11/2007 | Merry, Jr. et al. |
| 2009/0150640 A1* | 6/2009 | Royer ............... G06F 9/5077 711/173 |
| 2009/0172340 A1* | 7/2009 | Tang ................ G06F 12/0246 711/203 |
| 2011/0125954 A1* | 5/2011 | Yeh .................. G06F 12/0246 711/103 |
| 2012/0131593 A1* | 5/2012 | DePetro ............ G06F 9/5088 718/105 |

(Continued)

FOREIGN PATENT DOCUMENTS

| KR | 20150038386 A | 4/2015 |
| KR | 101516580 B1 | 5/2015 |

(Continued)

OTHER PUBLICATIONS

Notice of Allowance dated Oct. 26, 2020 for U.S. Appl. No. 16/660,651.

*Primary Examiner* — Christopher B Shin

(57) ABSTRACT

A memory system includes a memory device and a controller. The memory device includes first and second memory groups. The controller includes a resource controller and first and second flash translation layer (FTL) cores. Each of the first and second FTL cores manages a plurality of logical addresses (LAs) that are mapped, respectively, to a plurality of physical addresses (PAs) of a corresponding memory group. The resource controller determines LA use rates of the first and second FTL cores, selects a source FTL core and a target FTL core from the first and second FTL cores using the LA use rates, and balances the LA use rates of the source FTL core and the target FTL core by moving data stored in storage spaces associated with a portion of the LAs from the source FTL core to storage spaces associated with the target FTL core.

20 Claims, 15 Drawing Sheets

(56) References Cited

U.S. PATENT DOCUMENTS

| | | | | |
|---|---|---|---|---|
| 2013/0124785 A1* | 5/2013 | Xiong | ............... | G06F 21/6245 |
| | | | | 711/103 |
| 2014/0189302 A1* | 7/2014 | Subbareddy | .......... | G06F 9/5094 |
| | | | | 712/30 |
| 2015/0234606 A1* | 8/2015 | Im | ...................... | G06F 12/0246 |
| | | | | 711/103 |
| 2016/0070601 A1* | 3/2016 | Yamamoto | ............ | G06F 9/5077 |
| | | | | 718/105 |
| 2016/0357454 A1* | 12/2016 | Lee | ....................... | G06F 13/385 |
| 2017/0277571 A1* | 9/2017 | Yoo | ...................... | G06F 9/5022 |
| 2019/0227618 A1* | 7/2019 | Huang | ................. | G06F 1/3275 |
| 2019/0235762 A1* | 8/2019 | Kaburaki | ............ | G06F 12/0864 |
| 2019/0384706 A1* | 12/2019 | Kao | ................... | G06F 12/0882 |
| 2020/0117368 A1* | 4/2020 | Jiang | .................... | G06F 3/0616 |
| 2020/0233588 A1* | 7/2020 | Li | ........................ | G06F 3/0679 |

FOREIGN PATENT DOCUMENTS

| | | |
|---|---|---|
| KR | 101576575 B1 | 12/2015 |
| KR | 20180052465 A | 5/2018 |

\* cited by examiner

FIG. 6A

| FIRST FTL CORE | | |
|---|---|---|
| LBA | PBA | BIT VALUE |
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 0 |
| 10 | 10 | 0 |

| SECOND FTL CORE | | |
|---|---|---|
| LBA | PBA | BIT VALUE |
| 11 | 11 | 1 |
| 12 | 12 | 1 |
| 13 | 13 | 0 |
| 14 | 14 | 0 |
| 15 | 15 | 0 |
| 16 | 16 | 0 |
| 17 | 17 | 0 |
| 18 | 18 | 0 |
| 19 | 19 | 0 |
| 20 | 20 | 0 |

FIG. 6B

| FIRST FTL CORE | | |
|---|---|---|
| LBA | PBA | BIT VALUE |
| 1 | 1 | 1 |
| 2 | 2 | 1 |
| 3 | 3 | 1 |
| 4 | 4 | 1 |
| 5 | 5 | 1 |
| 6→13 | 6 | 1→0 |
| 7→14 | 7 | 1→0 |
| 8→15 | 8 | 1→0 |
| 9 | 9 | 0 |
| 10 | 10 | 0 |

| SECOND FTL CORE | | |
|---|---|---|
| LBA | PBA | BIT VALUE |
| 11 | 11 | 1 |
| 12 | 12 | 1 |
| 13→6 | 13 | 0→1 |
| 14→7 | 14 | 0→1 |
| 15→8 | 15 | 0→1 |
| 16 | 16 | 0 |
| 17 | 17 | 0 |
| 18 | 18 | 0 |
| 19 | 19 | 0 |
| 20 | 20 | 0 |

CONTROLLER, MEMORY SYSTEM INCLUDING THE SAME, AND METHOD OF OPERATING MEMORY SYSTEM

CROSS-REFERENCE TO RELATED APPLICATION

The present application claims priority under 35 U.S.C. § 119(a) to Korean patent application number 10-2019-0039117, filed on Apr. 3, 2019, which is incorporated herein by reference in its entirety.

BACKGROUND

Field of Invention

Various embodiments of the present disclosure generally relate to an electronic device, and more particularly, to a controller for balancing data utilization among a plurality of flash translation layer cores, a memory system including the controller, and a method of operating the memory system.

Description of Related Art

In general, an electronic device uses a memory system which employs a controller and a memory device. The memory device is used as a main memory device or an auxiliary memory device of the electronic device.

The memory system may include a universal serial bus (USB) memory device, a memory card having various interfaces, a solid state drive (SSD), or the like.

In the memory system, the controller controls operations of the memory device, and the memory device provides advantages in that, since there is no mechanical driving part, stability and durability are excellent, an information access speed is increased, and power consumption is reduced. The memory device may include nonvolatile memory devices such as flash memory devices. The flash memory device may include a NOR type memory and a NAND type memory.

As an electronic device demands a memory system capable of storing a large amount of data, the memory system includes a large number of flash memory devices. To manage the large number of flash memory devices, the memory system may include a plurality of flash translation layer (FTL) cores. The FTL cores perform, among other functions, managing information for mapping Logical Addresses (LAs) to Physical Addresses (PAs) and performing said mapping.

SUMMARY

Embodiments of the present disclosure relate to a controller for balancing data utilization among a plurality of flash translation layer cores, a memory system including the controller, and a method of operating the memory system.

In an embodiment, a memory system includes a memory device including first and second memory groups, and a controller including a resource controller and first and second flash translation layer (FTL) cores, each of the first and second FTL cores managing a plurality of logical addresses (LAs) that are mapped, respectively, to a plurality of physical addresses (PAs) of a corresponding memory group. The resource controller is configured to determine LA use rates of the first and second FTL cores, select a source FTL core and a target FTL core from the first and second FTL cores using the LA use rates, and balance the LA use rates of the source FTL core and the target FTL core by moving data stored in storage spaces associated with a portion of the LAs from the source FTL core to storage spaces associated with the target FTL core.

In an embodiment, a controller includes a plurality of FTL cores, each of the plurality of FTL cores managing a plurality of logical addresses (LAs) that are mapped, respectively, to a plurality of physical addresses (PAs), and a resource controller configured to determine LA use rates of the plurality of FTL cores, select a source FTL core and a target FTL core from the plurality of FTL cores based on the LA use rates, and perform an LA allocation control operation on the source FTL core and the target FTL core so that the LA use rates of the source FTL core and the target FTL core are balanced.

In an embodiment, a method for operating a memory system includes determining LA use rates of a plurality of FTL cores, each of the plurality of FTL cores managing a plurality of logical addresses (LAs) that are mapped, respectively, to a plurality of physical addresses (PAs) of a memory device, selecting a source FTL core and a target FTL core from the plurality of FTL cores based on the LA use rates, and balancing the LA use rates of the source FTL core and the target FTL core.

BRIEF DESCRIPTION OF THE DRAWINGS

FIGS. 6A and 6B are conceptional views for illustrating an LBA allocation control operation in accordance with an embodiment of the present disclosure.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described order, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative, and are not intended to be exclusive or limiting. For the purpose of clarity, technical material that is known in the technical fields related to this disclosure has not been described in detail so that the disclosure is not unnecessarily obscured.

Figure 1:
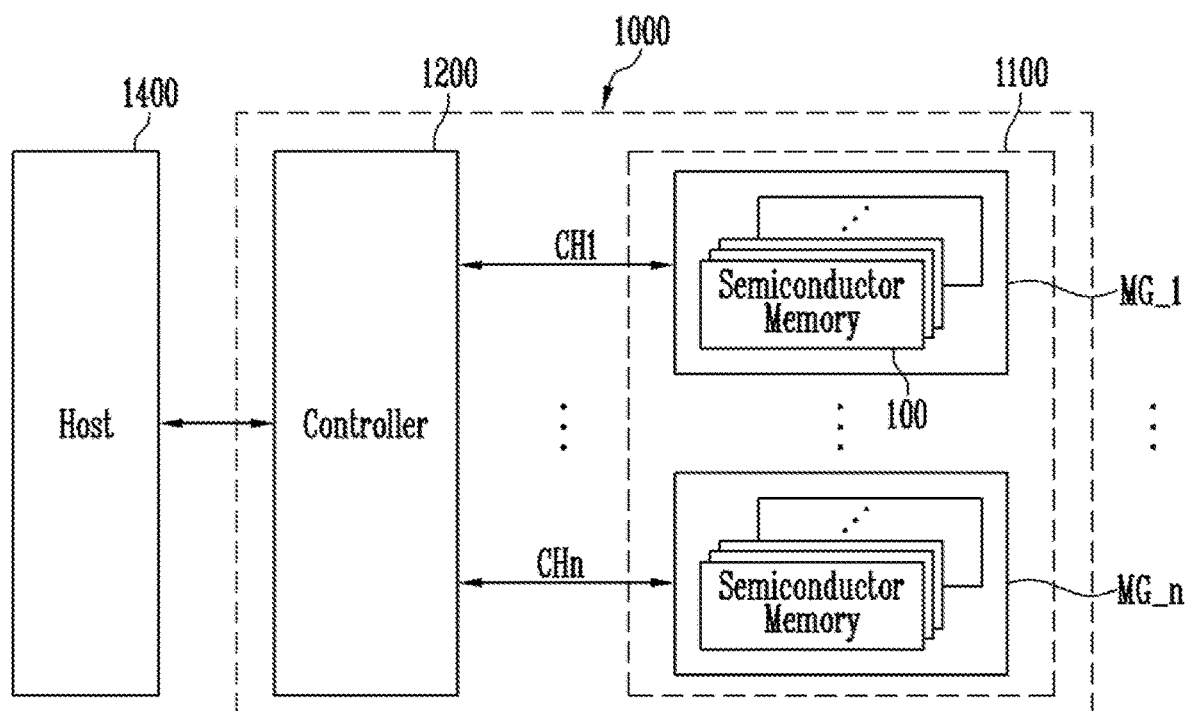
FIG. 1 illustrates a memory system in accordance with an embodiment of the present disclosure.

FIG. 1 illustrates a memory system 1000 in accordance with an embodiment of the present disclosure. The memory system 1000 may include a memory device 1100 and a controller 1200. The memory device 1100 may include a plurality of semiconductor memories 100.

The plurality of semiconductor memories 100 may be divided into a plurality of memory groups MG_1 to MG_n, n being a positive integer. The plurality of memory groups MG_1 to MG_n may communicate with the controller 1200 through first to n-th channels CH1 to CHn, respectively. Each of the plurality of semiconductor memories 100 will be described below with reference to FIG. 2.

Each of the plurality of memory groups MG_1 to MG_n may communicate with the controller 1200 through a corresponding channel of the first to n-th channels CH1 to CHn. For example, the first memory group MG_1 may communicate with the controller 1200 through the first channel CH1, and the nth memory group MG_n may communicate with the controller 1200 through the n-th channel CHn.

The first to n-th channels CH1 to CHn may be grouped into two or more channel groups based on a plurality of flash translation layer (FTL) cores included in the controller 1200. For example, when the controller 1200 includes a first FTL core and a second FTL core, half of the first to n-th channels CH1 to CHn may be defined as a first channel group corresponding to the first FTL core, and the other half may be defined as a second channel group corresponding to the second FTL core.

Furthermore, semiconductor memories 100 that are coupled to the first channel group may be controlled by the first FTL core, and semiconductor memories 100 that are coupled to the second channel group may be controlled by the second FTL core. Therefore, the controller 1200 may control the plurality of semiconductor memories 100 of the memory device 1100 through the plurality of channels CH1 to CHn.

The semiconductor memories 100 may be nonvolatile memory devices such as flash memory devices. The flash memory device may include a NOR type memory or a NAND type memory. However, embodiments are not limited thereto.

The controller 1200 may be connected between a host 1400 and the memory device 1100 and provide an interface between the memory device 1100 and the host 1400. The controller 1200 may access the memory device 1100 in response to a request from the host 1400. For example, the controller 1200 may control a read operation, a write operation, an erase operation, and a background operation of the memory device 1100 in response to a request and a logical address received from the host 1400. The logical address may include a logical block address (LBA). The controller 1200 may execute firmware for controlling the memory device 1100.

The controller 1200 in accordance with an embodiment may include the plurality of FTL cores. Each of the plurality of FTL cores may be set such that the same number of LBAs is allocated thereto. In response to an LBA received from the host 1400, one of the plurality of FTL cores to which the received LBA is allocated may be selected to process a request received from the host 1400.

In an embodiment, among the plurality of FTL cores, when an FTL core having a higher LBA use rate (explained below) is selected as a source FTL core and an FTL core having a lower LBA use rate is selected as a target FTL core, a portion of used LBAs allocated to the source FTL core may be selected and then re-allocated to the target FTL core, and a portion of unused LBAs allocated to the target FTL core may be selected and then re-allocated to the source FTL core. Thereby, LBA use rates of the plurality of FTL cores may be controlled to be balanced.

In an embodiment, the "used LBA" is an LBA that is mapped to a physical block address (PBA) corresponding to a storage space of the memory device 1100 on which a write operation has been performed since a last erase cycle of the storage space. The "unused LBA" is an LBA that is mapped to a PBA corresponding to a storage space of the memory device 1100 on which a write operation has not been performed since a last erase cycle of the storage spaces. The "LBA use rate" indicates a ratio of a number of used LBAs to a total number of LBAs allocated to an FTL core. In an embodiment, the storage space of the memory device 1100 may be a memory block that is a unit for an erase operation of the memory system 1000, but embodiments are not limited thereto.

The host 1400 may control the memory system 1000. The host 1400 may include a portable electronic device such as a computer, a personal digital assistant (PDA), a portable multimedia player (PMP), an MP3 player, a camera, a camcorder, a mobile phone, or the like. The host 1400 may use a command, e.g., a read command, a write command, or an erase command, to make a request for a write operation, a read operation, or an erase operation of the memory system 1000. Furthermore, the host 1400 may transmit, along with the command, an LBA on which a requested operation is to be performed, to the memory system 1000.

The controller 1200 and the memory device 1100 may be integrated into a single semiconductor device. The single semiconductor device may include a memory card, a solid state drive (SSD), or the like. The memory card may include a personal computer memory card international association (PCMCIA), a compact flash card (CF), a smart media card (SM or SMC), a memory stick multimedia card (MMC, RS-MMC, or MMCmicro), a SD card (SD, miniSD, microSD, or SDHC), a universal flash storage (UFS), or the like.

In other embodiments, the memory system 1000 may be provided as one of various elements of an electronic device such as a computer, an ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the memory device 1100 or the memory system 1000 may be embedded in various types of packages. For example, the memory device 1100 or the memory system 1000 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like.

Figure 2:
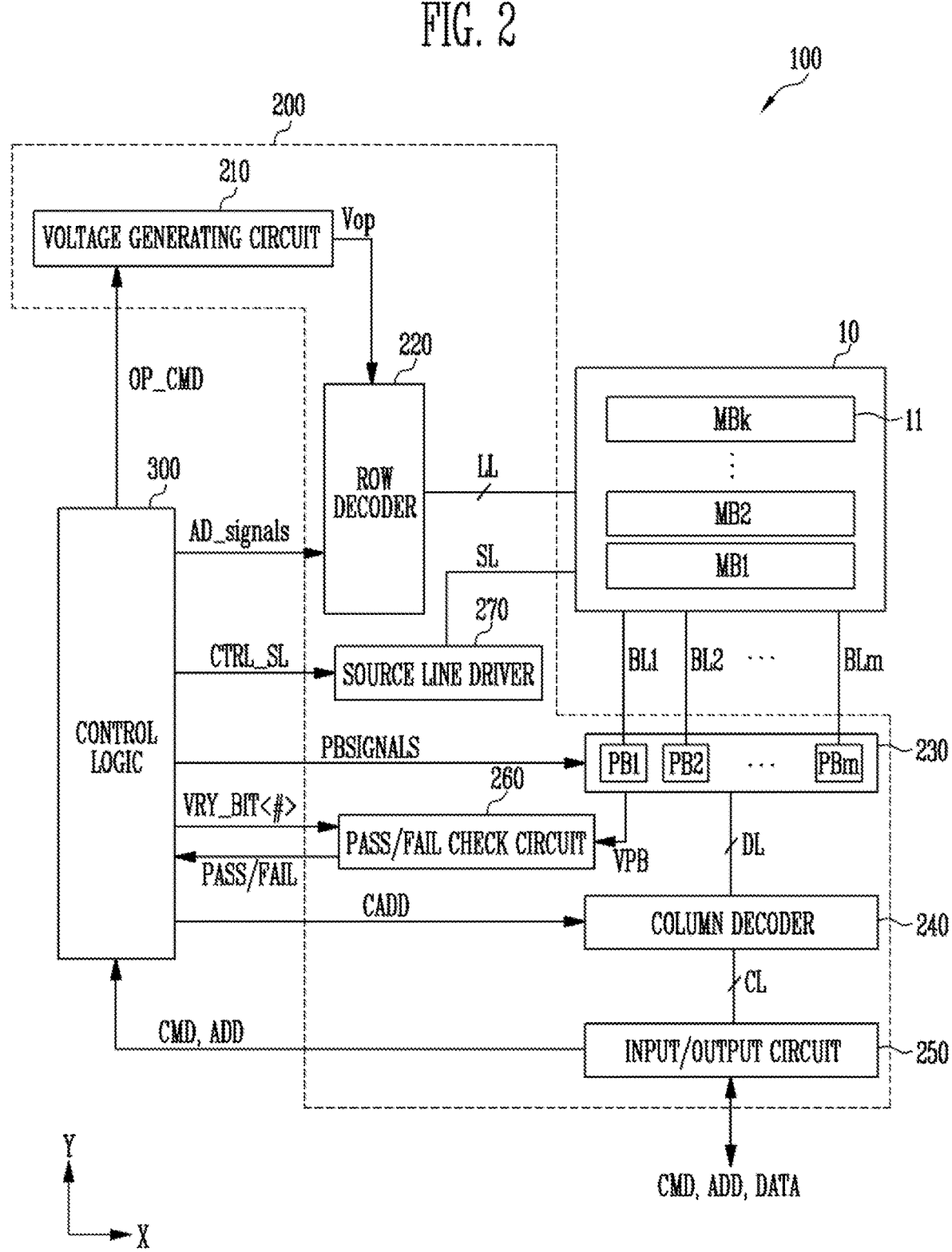
FIG. 2 illustrates a semiconductor memory of FIG. 1 in accordance with an embodiment of the present disclosure.

FIG. 2 illustrates the semiconductor memory 100 of FIG. 1 in accordance with an embodiment of the present disclosure. The semiconductor memory 100 may include a memory cell array 10, peripheral circuits 200, and a control logic 300.

The memory cell array 10 is configured to store data. The peripheral circuits 200 are configured to perform a program operation for storing data in the memory cell array 10, a read operation for outputting data stored in the memory cell array 10, and an erase operation for erasing data stored in the memory cell array 10. The control logic 300 is configured to control the peripheral circuits 200 under the control of the controller 1200 of FIG. 1.

The memory cell array 10 may include a plurality of memory blocks MB1 to MBk, k being a positive integer, and each of the memory blocks MB1 to MBk may include a plurality of memory cells. Local lines LL may be coupled to each of the memory blocks MB1 to MBk. Bit lines BL1 to BLm, m being a positive integer, may be coupled in common to the memory blocks MB1 to MBk.

The local lines LL may include a first select line, a second select line, and a plurality of word lines arranged between the first and the second select lines. The first select line may be a source select line, and the second select line may be a drain select line.

In another embodiment, the local lines LL may further include dummy lines arranged between the first select line and the plurality of word lines and between the second select line and the plurality of word lines. However, embodiments are not limited thereto. In still another embodiment, the local lines LL may further include pipelines.

Each of the memory blocks MB1 to MBk may be embodied in a two- or three-dimensional structure. For example, in a memory block having the two-dimensional structure, memory cells may be arranged in a direction parallel to a substrate. In a memory block having the three-dimensional structure, memory cells may be stacked in a direction perpendicular to the substrate. The two- or three-dimensional structure of a memory block is well known in the art. Therefore, detailed descriptions thereof are omitted herein.

At least one memory block of the memory blocks MB1 to MBk may be defined as a system memory block. Map data for mapping a LBA to a PBA may be stored in the system memory block.

The peripheral circuits 200 may perform a program operation, a read operation, or an erase operation on a selected memory block 11 under the control of the control logic 300. For instance, the peripheral circuits 200 may include a voltage generating circuit 210, a row decoder 220, a page buffer group 230, a column decoder 240, an input/output circuit 250, a pass/fail check circuit 260, and a source line driver 270.

The voltage generating circuit 210 may generate various operating voltages Vop to be used for a program operation, a read operation, and an erase operation in response to an operating signal OP_CMD output from the control logic 300. Furthermore, the voltage generating circuit 210 may selectively discharge the local lines LL in response to the operating signal OP_CMD. For example, the operating voltages Vop may include a program voltage, a verify voltage, a pass voltage, and a select transistor operating voltage.

The row decoder 220 may transmit the operating voltages Vop to the local lines LL coupled to the selected memory block 11 in response to control signals AD_signals output from the control logic 300. For example, the row decoder 220 may selectively apply the operating voltages Vop, e.g., the program voltage, the verify voltage, and the pass voltage, to the plurality of word lines among the local lines LL in response to the control signals AD_signals.

During a program voltage applying operation, in response to the control signals AD_signals, the row decoder 220 may apply the program voltage to a selected word line of the local lines LL, and apply the pass voltage to the other unselected word lines. During a read operation, in response to the control signals AD_signals, the row decoder 220 may apply the read voltage to a selected word line of the local lines LL, and apply the pass voltage to the other unselected word lines.

The page buffer group 230 may include a plurality of page buffers PB1 to PBm respectively coupled to the bit lines BL1 to BLm. The page buffers PB1 to PBm may operate in response to page buffer control signals PBSIGNALS. For instance, the page buffers PB1 to PBm may temporarily store data to be programmed during a program operation, or sense voltages or currents of the bit lines BL1 to BLm during a read or verify operation.

The column decoder 240 may transmit data between the input/output circuit 250 and the page buffer group 230 in response to a column address CADD. For example, the column decoder 240 may exchange data with the page buffer group 230 through data lines DL or exchange data with the input/output circuit 250 through column lines CL.

The input/output circuit 250 may transmit, to the control logic 300, an internal command CMD and an address ADD received from the controller 1200 of FIG. 1, and exchange data with the column decoder 240.

During a read operation or a verify operation, the pass/fail check circuit 260 may generate a reference current in response to an enable bit VRY_BIT<#>, compare a sensing voltage VPB received from the page buffer group 230 with a reference voltage generated by the reference current, and output a pass signal PASS or a fail signal FAIL to the control logic 300.

The source line driver 270 may be coupled, through a source line SL, to the memory cells included in the memory cell array 10, and control a source line voltage to be applied to the source line SL. The source line driver 270 may receive a source line control signal CTRL_SL from the control logic 300, and control the source line voltage based on the source line control signal CTRL_SL.

The control logic 300 may control the peripheral circuits 200 by outputting the operating signal OP_CMD, the control signals AD_signals, the page buffer control signals PBSIG- NALS, the enable bit VRY_BIT<#>, the source line control signal CTRL_SL, and the column address CADD in response to the internal command CMD and the address ADD. In addition, the control logic 300 may determine whether a target memory cell has passed a verification during the verify operation in response to the pass signal PASS or the fail signal FAIL.

Figure 3:
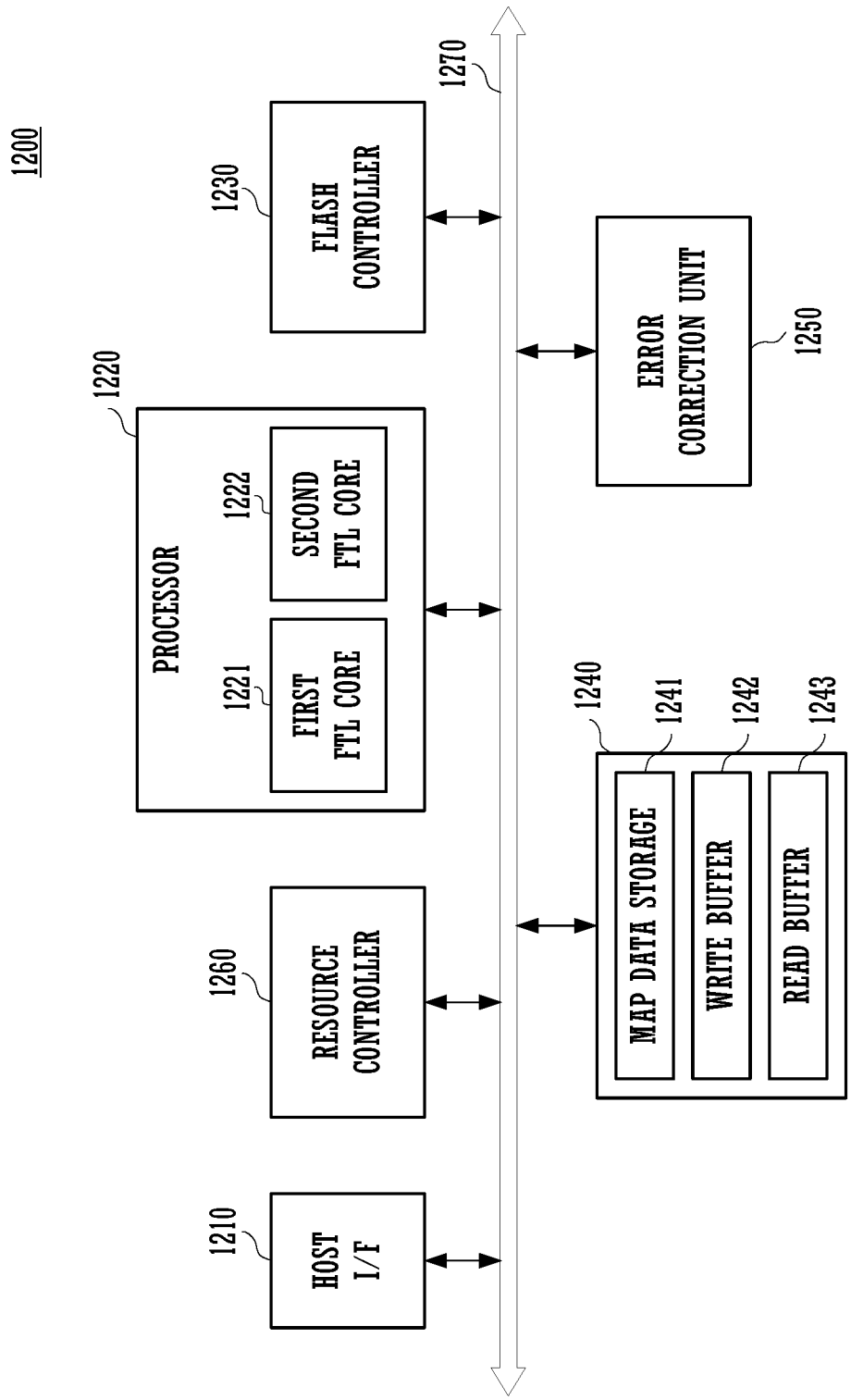
FIG. 3 illustrates a controller of FIG. 1 in accordance with an embodiment of the present disclosure.

FIG. 3 illustrates the controller 1200 of FIG. 1 in accordance with an embodiment of the present disclosure. The controller 1200 may include a host interface (I/F) 1210, a processor 1220, a flash controller 1230, a buffer memory 1240, an error correction unit 1250, a resource controller 1260, and a bus 1270.

The host interface 1210 may provide an interface between the host 1400 of FIG. 1 and the controller 1200. The host interface 1210 may physically and electrically connect the controller 1200 to the host 1400. Thus, the controller 1200 may communicate with the host 1400 through the host interface 1210.

In an embodiment, the host interface 1210 may control data transmission between the host 1400 and the buffer memory 1240. For example, the host interface 1210 may control an operation of buffering data input from the host 1400 in the buffer memory 1240, and control an operation of outputting data buffered in the buffer memory 1240 to the host 1400.

The host interface 1210 may communicate with the host 1400 using one or more of various interface protocols such as universal serial bus (USB), a multi-media card (MMC), a peripheral component interconnect-express (PCI-E), a small computer system interface (SCSI), a serial-attached SCSI (SAS), a serial advanced technology attachment (SATA), a parallel advanced technology attachment (PATA), an enhanced small disk interface (ESDI), an integrated drive electronics (IDE), and the like. The host interface 1210 may be driven by firmware, that is, a host interface layer (HIL), to exchange data with the host 1400.

The processor 1220 may control the overall operation of the controller 1200. The processor 1220 may communicate with the host 1400 through the host interface 1210, and communicate with the memory device 1100 through the flash controller 1230. The processor 1220 may control the buffer memory 1240. The processor 1220 may control an operation of the memory system 1000 by using the buffer memory 1240 as an operation memory, a cache memory, or a buffer.

In an embodiment, the processor 1220 may include a plurality of FTL cores. The plurality of FTL cores may execute firmware stored in the buffer memory 1240 to perform a logical-physical address mapping operation for mapping an LBA received from the host 1400 to a PBA for selecting a corresponding storage space, e.g., a memory block or a semiconductor memory, in the memory device 1100.

A plurality of LBAs are mapped to a plurality of PBAs, respectively. In an embodiment, the plurality of LBAs are grouped into a plurality of LBA clusters respectively allocated to the plurality of FTL cores. Thus, each of the plurality of FTL cores manages a corresponding LBA cluster including a multiplicity of LBAs to perform the logical-physical address mapping operation.

For illustrative convenience, FIG. 3 shows the processor 1220 that includes two FTL cores, e.g., a first FTL core 1221 and a second FTL core 1222. Thus, the plurality of LBAs are grouped into a first LBA cluster and a second LBA cluster. The first LBA cluster may be allocated to the first FTL core 1221, and the second LBA cluster may be allocated to the second FTL core 1222. In an embodiment, the first LBA cluster includes the same number of LBAs as the second LBA cluster.

When an LBA which corresponds to any LBA in the first LBA cluster is received from the host 1400, the first FTL core 1221 may execute firmware stored in the buffer memory 1240 and map the received LBA to a corresponding PBA.

Furthermore, the first FTL core 1221 may generate a command queue in response to a host command received along with the LBA included in the first LBA cluster, and provide the command queue to the flash controller 1230.

As described above with reference to FIG. 1, the first FTL core 1221 may correspond to channels included in the first channel group among the first to n-th channels CH1 to CHn of FIG. 1, and control a write operation, a read operation, an erase operation, etc. of the semiconductor memories 100 coupled to the first channel group.

Therefore, when the first FTL core 1221 maps the LBAs of the first LBA cluster to corresponding PBAs of the memory device 1100, the LBAs of the first LBA cluster are mapped to PBAs designating the semiconductor memories 100 coupled to the channels of the first channel group.

In the same manner as the first FTL core 1221, when an LBA which corresponds to any LBA in the second LBA cluster is received from the host 1400, the second FTL core 1222 may execute the firmware stored in the buffer memory 1240 and map the received LBA to a corresponding PBA.

Furthermore, the second FTL core 1222 may generate a command queue in response to a host command received along with the LBA included in the second LBA cluster, and provide the command queue to the flash controller 1230. The second FTL core 1222 may correspond to channels included in the second channel group among the first to n-th channels CH1 to CHn of FIG. 1, and control a write operation, a read operation, an erase operation, etc. of the semiconductor memories 100 coupled to the second channel group.

Therefore, when the second FTL core 1222 maps the LBAs of the second LBA cluster to corresponding PBAs of the memory device 1100, the LBAs of the second LBA cluster are mapped to PBAs designating the semiconductor memories 100 coupled to the channels of the second channel group.

The flash controller 1230 may generate and output an internal command for controlling the memory device 1100 in response to the command queue received from the processor 1220. During a write operation, the flash controller 1230 may perform an operation of transmitting and programming write data buffered in the buffer memory 1240 to the memory device 1100 in response to the command queue. During a read operation, the flash controller 1230 may perform an operation of buffering, in the buffer memory 1240, data read from the memory device 1100 in response to the command queue. The flash controller 1230 may include a memory interface, including interfaces to each of the first to n-th channels CH1 to CHn of FIG. 1.

The buffer memory 1240 may be used as an operation memory, a cache memory, or a buffer of the processor 1220. The buffer memory 1240 may store codes and instructions to be executed by the processor 1220. The buffer memory 1240 may also store data that is processed by the processor 1220.

Moreover, the buffer memory 1240 may store map data for the logical-physical mapping operation that is performed by the processor 1220. The map data may be also stored in the memory device 1100 of FIG. 1, and may be read from the memory device 1100 during a power-on operation of the memory system 1000 and stored in the buffer memory 1240.

In addition, in the write operation, the buffer memory 1240 may temporarily store the write data received from the host 1400, and transmit the temporarily stored write data to the memory device 1100 through the flash controller 1230. In the read operation, the buffer memory 1240 may temporarily store read data received from the memory device 1100, and transmit the temporarily stored read data to the host 1400 through the host interface 1210.

The buffer memory 1240 may include a map data storage 1241 for storing the map data for the logical-physical mapping operation, a write buffer 1242 for storing the write data that is from the host 1400 and to be programmed in the memory device 1100, and a read buffer 1243 for storing the read data that is read from the memory device 1100 and to be transmitted to the host 1400. The buffer memory 1240 may include any of a static RAM (SRAM), a dynamic RAM (DRAM), and the like.

The error correction unit 1250 may perform an error correction operation. The error correction unit 1250 may perform an error correction code (ECC) encoding operation on the write data to be programmed to the memory device 1100. ECC encoded write data may be transmitted to the memory device 1100 through the memory interface in the flash controller 1230. The error correction unit 1250 may perform an ECC decoding operation on the read data read from the memory device 1100.

In the embodiment of FIG. 3, the error correction unit 1250 is implemented as being separated from the flash controller 1230, but embodiments are not limited thereto. In another embodiment, the error correction unit 1250 may be included in the flash controller 1230 as a component of the flash controller 1230.

The resource controller 1260 may manage the LBAs allocated to the first and second FTL cores 1221 and 1222 included in the processor 1220. When a host command and an LBA are received from the host 1400 through the host interface 1210, the resource controller 1260 may select one of the first and second FTL cores 1221 and 1222 in response to the received LBA and transmit the host command and the LBA to the selected FTL core.

Furthermore, the resource controller 1260 may perform an LBA allocation control operation for balancing the number of used LBAs allocated to the first FTL core 1221 and the number of used LBAs allocated to the second FTL cores 1222 using LBA use rates of the first FTL core 1221 and the second FTL core 1222.

In particular, the resource controller 1260 may determine the LBA use rates of the plurality of FTL cores, select, among the plurality of FTL cores, a source FTL core having a higher LBA use rate and a target FTL core having a lower LBA use rate based on the determined LBA use rates, select a portion of used LBAs allocated to the source FTL core and a portion of unused LBAs allocated to the target FTL core, move data stored in storage spaces corresponding to the selected used LBAs to storage spaces corresponding to the selected unused LBAs, and re-allocate the selected used LBAs and the selected unused LBAs to the target FTL core and the source FTL core, respectively. The storage spaces where the data had been stored in the memory device 1100 may be marked as invalid and queued for erasure.

For example, when one or more memories in the first memory group MG_1 (in FIG. 1) correspond to the selected used LBAs and one or more memories in the nth memory group MG_n (in FIG. 1) correspond to the selected unused LBAs, data stored in the one or more memories of the first memory group MG_1 is moved to the one or more memories of the nth memory group MG_n. The storage spaces where the data had been stored in the one or more memories of the first memory group MG 1 may be marked as invalid and queued for erasure.

The LBA allocation control operation performed by the resource controller 1260 will be described in detail with reference to FIGS. 4 to 10.

In the embodiment of FIG. 3, the host interface 1210 is implemented as being separated from the resource controller 1260, but embodiments are not limited thereto. In another embodiment, the host interface 1210 and the resource controller 1260 may be integrated to each other.

The bus 1270 may provide a channel between the components of the controller 1200, e.g., the host interface 1210, the processor 1220, the flash controller 1230, the buffer memory 1240, the error correction unit 1250, and the resource controller 1260.

Figure 4:
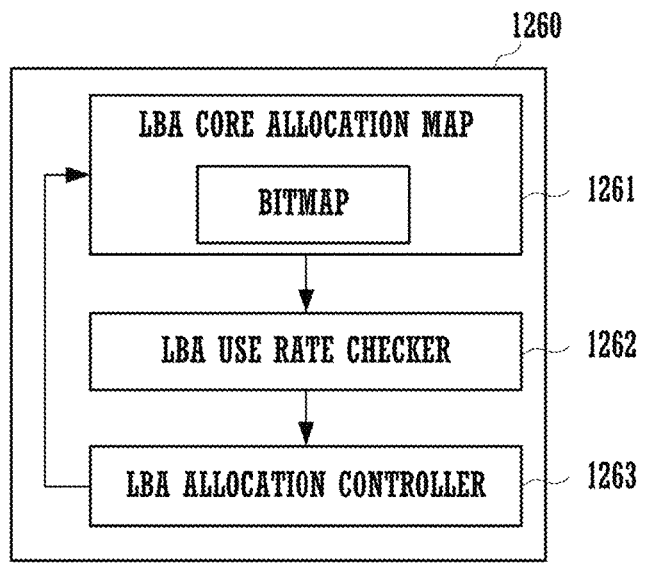
FIG. 4 illustrates a resource controller of FIG. 3 in accordance with an embodiment of the present disclosure.

FIG. 4 illustrates the resource controller 1260 of FIG. 3 in accordance with an embodiment of the present disclosure. The resource controller 1260 may include an LBA core allocation map unit 1261, an LBA use rate checker 1262, and an LBA allocation controller 1263.

The LBA core allocation map unit 1261 may store and manage information indicating LBAs allocated to the plurality of FTL cores included in the processor 1220 of FIG. 3.

Figure 5:
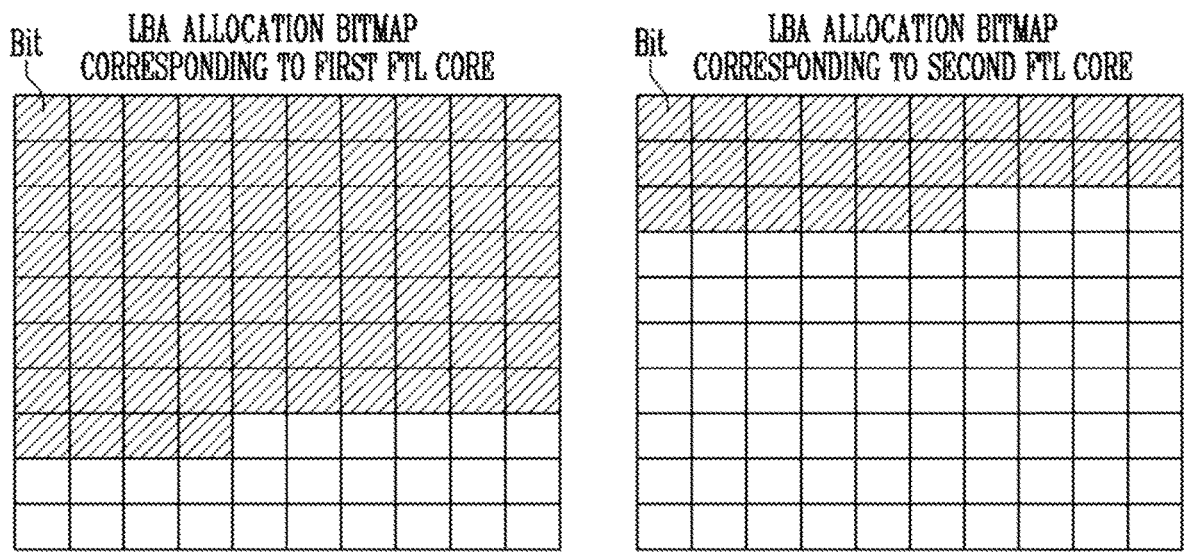
FIG. 5 illustrates logical block address (LBA) bitmaps corresponding to flash translation layer (FTL) cores in accordance with an embodiment of the present disclosure.
Figure 7A:
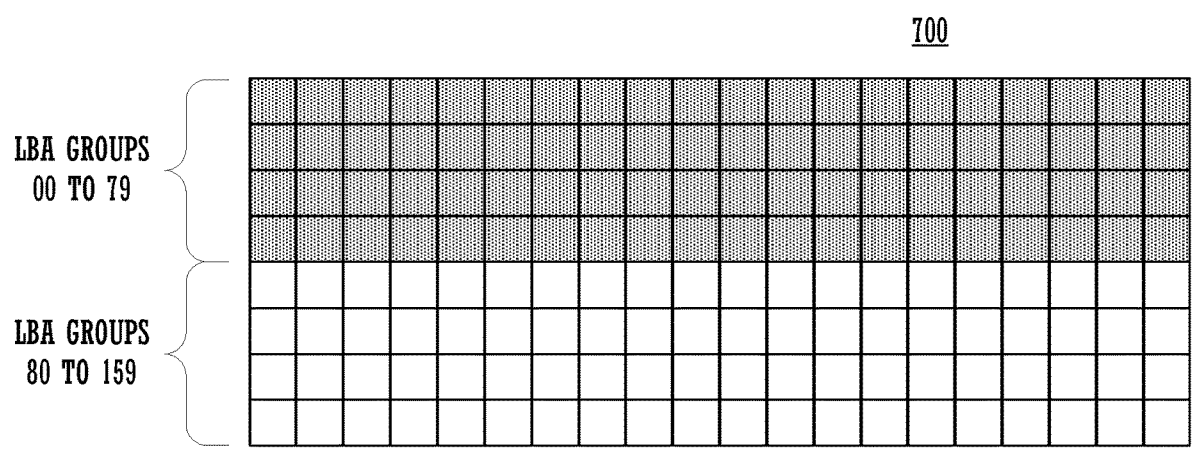
FIGS. 7A and 7B illustrate an LBA bitmap for use in an LBA allocation control operation in accordance with an embodiment of the present disclosure.
Figure 7B:
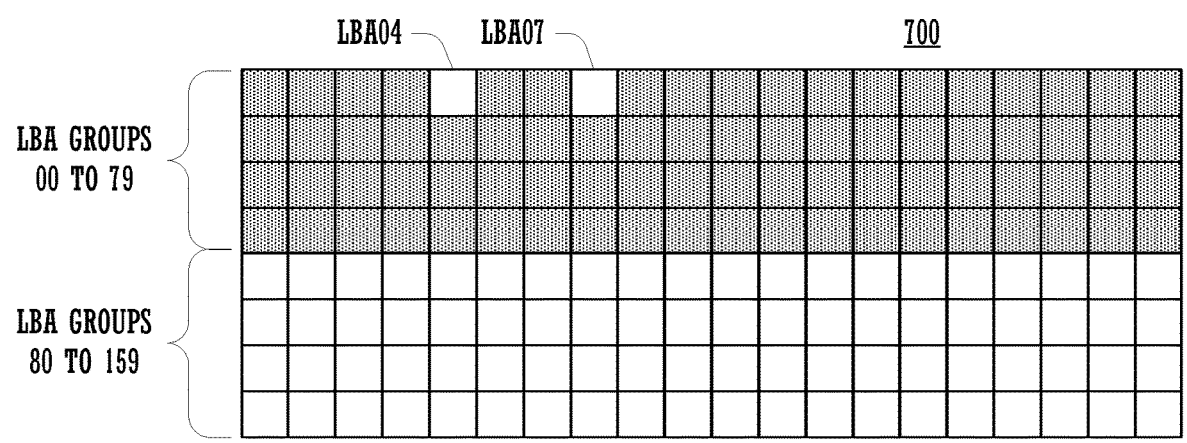

In the embodiment having two FTL cores, e.g., the first FTL core 1221 and the second FTL core 1222 shown in FIG. 3, the information may be stored as bitmap(s) as illustrated in FIG. 5 or FIGS. 7A and 7B.

In an embodiment, as illustrated in FIG. 5, the LBA core allocation map unit 1261 may include first and second LBA allocation bitmaps respectively corresponding to the first FTL core 1221 and the second FTL core 1222. The LBA use rate checker 1262 may check the LBA allocation bitmaps stored in the LBA core allocation map unit 1261, and determine an LBA use rate of each of the first and second FTL cores 1221 and 1222. The LBA use rate may be determined as a ratio of a number of used LBAs to a total number of LBAs allocated to the corresponding FTL core. The above operation of the LBA use rate checker 1262 may be performed periodically or in response to a request of the host 1400.

In another embodiment, as illustrated in FIGS. 7A and 7B, the LBA core allocation map unit 1261 may include an LBA allocation bitmap including LBA groups 00 to 79 allocated to the first FTL core 1221 and LBA groups 80 to 159 allocated to the second FTL core 1222. The LBA group may include one or more adjacent LBAs. The LBA use rate checker 1262 may check the LBA allocation bitmap stored in the LBA core allocation map unit 1261, and determine an LBA use rate of each of the first and second FTL cores 1221 and 1222. The LBA use rate may be determined as a ratio of a number of used LBA groups to a total number of LBA groups allocated to the corresponding FTL core.

The LBA allocation control operation associated with FIG. 5 and FIGS. 7A and 7B will be described in detail later.

As described above, the used LBAs may be LBAs respectively mapped to PBAs corresponding to storage spaces of the memory device 1100 of FIG. 1 on which a write operation has been performed since a last erase cycle of the storage spaces. The unused LBAs may be LBAs respectively mapped to PBAs corresponding to storage spaces of the memory device 1100 on which a write operation has not been performed since a last erase cycle of the storage spaces.

In an embodiment, the LBA allocation controller 1263 may compare the LBA use rates determined by the LBA use rate checker 1262 with a first threshold value and a second threshold value, select a source FTL core and a target FTL core based on the comparison result, and perform the LBA allocation control operation on the selected source FTL core and target FTL cores. The first threshold value may be greater than the second threshold value. The source FTL core may have an LBA use rate equal to or greater than the first threshold value, and the target FTL core may have an LBA use rate less than the second threshold value.

In an embodiment, as the comparison result, if there are two or more FTL cores each having an LBA use rate that is equal to or greater than the first threshold value, an FTL core having a higher LBA use rate, among the two or more FTL cores, is selected as the source FTL core. If there are two or more FTL cores each having an LBA use rate that is less than the second threshold value, an FTL core having a lower LBA use rate, among the two or more FTL cores, is selected as the target FTL core. However, embodiments are not limited thereto.

In another embodiment, after the FTL core having the LBA use rate equal to or greater than the first threshold value and the FTL core having the LBA use rate less than the second threshold value are detected as a result of comparing the LBA use rates determined by the LBA use rate checker 1262 with the first threshold value and the second threshold value, the LBA allocation controller 1263 may further compare a difference of the LBA use rates of the detected two FTL cores with a third threshold value. If the difference is equal to or greater than the third threshold value, the FTL core having the LBA use rate equal to or greater than the first threshold value is selected as the source FTL core, and the FTL core having the LBA use rate less than the second threshold value is selected as the target FTL core. In an embodiment, the third threshold value is greater than a difference between the first and second threshold values.

In still another embodiment, the LBA allocation controller 1263 may compare the LBA use rates of the plurality of FTL cores with each other, and select any two FTL cores having a difference of the LBA use rates that is equal to or greater than a third threshold value. One of the two FTL cores having a higher LBA use rate is selected as the source FTL core, and the other having a lower LBA use rate is selected as the target FTL core.

After the source FTL core and the target FTL core are selected, the LBA allocating controller 1263 may perform the LBA allocation control operation on the source FTL core and the target FTL core.

The LBA allocation control operation may further include an operation of re-allocating one or more of used LBAs of the source FTL core to the target FTL core. In an embodiment, the LBA allocation controller 1263 selects a portion of used LBAs of the source FTL core and a portion of unused LBAs of the target FTL core, and re-allocates the selected used LBAs and the selected unused LBAs to the target FTL core and the source FTL core, respectively, so that the number of used LBAs of the source FTL core and the number of used LBAs of the target FTL core are balanced. The portion of the used LBAs and the portion of the unused LBAs have the same number of LBAs.

In an embodiment, the number of the selected used LBAs and the number of the selected unused LBAs are determined by calculating half of a difference between a total number of used LBAs of the source FTL core and a total number of used LBAs of the target FTL core. As a result, a total number of LBAs allocated to each of the plurality of FTL cores may remain equal even after the LBA allocation control operation.

In an embodiment, the selected used LBAs of the source FTL core are used LBAs mapped to the "coldest" PBAs in the channel group corresponding to the source FTL core, e.g., PBAs having the smallest numbers of erase cycles, but embodiments are not limited thereto. In another embodiment, the selected used LBAs of the source FTL core are used LBAs mapped to the "hottest" PBAs in the channel group corresponding to the source FTL core, e.g., PBAs having the highest numbers of erase cycles.

During the LBA allocation control operation, the LBA allocation controller 1263 may control the flash controller 1230 to read data stored in a storage space of the memory device 1100 that corresponds to the selected used LBAs of the source FTL core, and to program the read data to a storage space of the memory device 1100 that corresponds to the selected unused LBAs of the target FTL core.

The LBA allocation controller 1263 may also control the LBA core allocation map unit 1261 to update LBA allocation bitmap(s) corresponding to the source and target FTL cores based on the re-allocation of the LBA allocation control operation.

In an embodiment, the LBA allocation controller 1263 may store LBA information allocated to each FTL core, and update the LBA information based on the re-allocation of the LBA allocation control operation. The LBA information may include information indicating the LBAs allocated to each FTL core.

The LBA allocation controller 1263 may further update the map data stored in the map data storage 1241 of FIG. 3 based on the re-allocation of the LBA allocation control operation.

FIG. 5 illustrates first and second LBA allocation bitmaps stored in the LBA core allocation map unit 1261 in accordance with an embodiment. The first and second LBA allocation bitmaps respectively correspond to the first FTL core 1221 and the second FTL core 1222 of FIG. 3.

The first and second LBA allocation bitmaps may classify LBAs allocated to the corresponding FTL core into used LBAs and unused LBAs, and separately represent the used LBA and the unused LBA using, e.g., 1-bit data. For illustrative convenience, in FIG. 5, the used LBAs and the unused LBAs are classified with and without slashes, respectively.

The 1-bit data included in the LBA allocation bitmap may correspond to one LBA or an LBA group including a plurality of adjacent LBAs. FIG. 5 illustrates that the 1-bit data corresponds to the LBA group.

Each bit indicates an used LBA group or an unused LBA group depending on a bit value '1' or a bit value '0,' respectively In an embodiment, the slashed bit refers to the bit value '1,' which indicates the used LBA group. The empty bit refers to the bit value '0,' which indicates the unused LBA group.

In FIG. 5, the LBA allocation bitmap corresponding to the first FTL core 1221 indicates an LBA use rate of 74%, and the LBA allocation bitmap corresponding to the second FTL core 1222 indicates an LBA use rate of 26%. Therefore, in an embodiment, when the first threshold value is 70 and the second threshold value is 30, the first FTL core 1221 can be selected as the source FTL core, and the second FTL core 1222 can be selected as the target FTL core. In another embodiment, when the third threshold value is 40, the first FTL core 1221 can be selected as the source FTL core, and the second FTL core 1222 can be selected as the target FTL core. However, embodiments are not limited thereto.

FIGS. 6A and 6B are conceptional views for describing the LBA allocation control operation in accordance with an embodiment of the present disclosure. FIGS. 6A and 6B respectively illustrate allocation of LBAs of FTL cores before and after the LBA allocation control operation is performed.

For illustrative convenience, it is assumed that the first and second FTL cores 1221 and 1222 in the processor 1220 of FIG. 3 are selected as the source FTL core and the target FTL core, respectively, and that each of the first and second FTL cores 1221 and 1222 includes 10 LBAs allocated thereto, the 10 LBAs being mapped to 10 PBAs.

Referring to FIG. 6A, before the LBA allocation control operation is performed, the first FTL core 1221, which is the source FTL core, has 8 used LBAs and 2 unused LBAs, and the second FTL core 1222, which is the target FTL core, has 2 used LBAs and 8 unused LBAs. In the first FTL core 1221, the 8 used LBAs includes $1^{st}$ to $8^{th}$ LBAs each having a bit value '1,' the 2 unused LBAs includes $9^{th}$ and $10^{th}$ LBAs each having a bit value '0.' The $1^{st}$ to $10^{th}$ LBAs respectively correspond to $1^{st}$ to 10th PBAs. In the second FTL core 1222, the 2 used LBAs includes $11^{th}$ and $12^{th}$ LBAs each having the bit value '1,' the 8 unused LBAs includes $13^{th}$ to $20^{th}$ LBAs each having the bit value '0.' The $11^{th}$ to $20^{th}$ LBAs respectively correspond to $11^{th}$ to $20^{th}$ PBAs.

In the LBA allocation control operation, in order to make the number of used LBAs of the source FTL core equal to the number of used LBAs of the target FTL core, a difference between the number of used LBAs of the source FTL core and the number of used LBAs of the target FTL core is determined. Half of the difference is determined as a target number of LBAs to be re-allocated.

In FIG. 6A, the target number of LBAs is determined as '3' since the number of used LBAs of the source FTL core is 8 and the number of used LBAs of the target FTL core is 2. Therefore, the LBA allocation controller 1263 selects 3 used LBAs of the source FTL core. For example, the LBA allocation controller 1263 selects the $6^{th}$ to $8^{th}$ LBAs as the 3 used LBAs. Furthermore, the LBA allocation controller 1263 selects 3 unused LBAs of the target FTL core. For example, the LBA allocation controller 1263 selects the $13^{th}$ to $15^{th}$ LBAs as the 3 unused LBAs.

Therefore, the LBA allocation controller 1263 controls the flash controller 1230 to read data stored in storage spaces of the memory device 1100 that correspond to the $6^{th}$ to $8^{th}$ PBAs mapped to the $6^{th}$ to $8^{th}$ LBAs, and programs the read data to storage spaces of the memory device 1100 that correspond to the $13^{th}$ to $15^{th}$ PBAs mapped to the 13th to $15^{th}$ LBAs.

The $6^{th}$ to $8^{th}$ LBAs of the source FTL core, which are selected as the 3 used LBAs, are exchanged with the $13^{th}$ to $15^{th}$ LBAs of the target FTL core, which are selected as the 3 unused LBAs. That is, the $6^{th}$ to 8th LBAs are re-allocated to the target FTL core, and the $13^{th}$ to $15^{th}$ LBAs are re-allocated to the source FTL core. After that, the LBA allocation bitmaps corresponding to the first and second FTL cores 1221 and 1222 and map data representing mapping between the $1^{st}$ to $20^{th}$ LBAs and the $1^{st}$ to $20^{th}$ PBAs are updated based on the result of the LBA allocation control operation.

As illustrated in FIG. 6B, after the LBA allocation control operation is performed, the first FTL core 1221 has the $1^{st}$ to $5^{th}$, $13^{th}$ to $15^{th}$, $9^{th}$ and $10^{th}$ LBAs that are mapped to the $1^{st}$ to $10^{th}$ PBAs, and the second FTL core 1222 has the $11^{th}$, $12^{th}$, $6^{th}$ to $8^{th}$, and $16^{th}$ to $20^{th}$ LBAs that are mapped to the $11^{th}$ to $20^{th}$ PBAs. In addition, since the data stored in the storage spaces corresponding to the $6^{th}$ to $8^{th}$ PBAs have been transferred to the storage spaces corresponding to the $13^{th}$ to 15th PBAs, bit values of LBAs corresponding to the $6^{th}$ to $8^{th}$ PBAs are changed to '0,' and, instead, bit values of LBAs corresponding to the $13^{th}$ to 15th PBAs are changed to '1.' That is, the bit values corresponding to the 13th to $15^{th}$ LBAs, which have been moved to the LBA allocation bitmap of the first FTL core 1221, are changed to '0.' The bit values corresponding to the $6^{th}$ to $8^{th}$ LBAs, which have been moved to the LBA allocation bitmap of the second FTL core 1222, are changed to '1.'

As a result, after the LBA allocation control operation is performed, the number of used LBAs in the first FTL core 1221 becomes equal to the number of used LBAs in the second FTL core 1222.

FIGS. 7A and 7B illustrate an LBA allocation bitmap 700 for use in the LBA core allocation map unit 1261 in accordance with an embodiment of the controller 1200 having two FTL cores. The LBA allocation bitmap 700 includes one or more bits for each LBA group, the one or more bits indicating which of the two FTL cores corresponds to the LBA group. Unlike the bitmaps of FIG. 5, the LBA allocation bitmap 700 does not indicate whether the LBA groups are used or not.

FIG. 7A illustrates an initial state of the LBA allocation bitmap 700, in which the LBA groups are allocated evenly, with LBA groups 00 to 79 allocated to the first FTL core 1221 (as indicated by the corresponding bits being shaded to indicate, e.g., a '0' state) and LBA groups 80 to 159 allocated to the second FTL core 1222 (as indicated by the corresponding bits being unshaded to indicate, e.g., a '1' state).

In an embodiment, when the LBA use rate checker 1262 determines the use rates of the first and second FTL cores 1221 and 1222, the LBA use rate checker 1262 uses information associated with wear leveling and garbage collection operations of the controller 1200 to determine whether an LBA group is used or not, uses the LBA allocation bitmap 700 to determine which FTL core the LBA group is allocated to, and updates a counter of the used LBA groups of that FTL core and a counter of the total number of allocated LBA groups of that FTL core accordingly. Once all the LBA groups have been so processed, LBA use rates for the first and second FTL cores 1221 and 1222 may be determined using the associated counters of each FTL core.

FIG. 7B illustrates an example of a state of the LBA allocation bitmap 700 after the LBA allocation control operation is performed. In the example, the LBA allocation control operation determined that the first FTL core 1221 had 4 more used LBA groups than the second FTL core 1222. In response, the LBA allocation control operation re-allocated an LBA group having an LBA group address of 04 and an LBA group having an LBA group address of 07 from the first FTL core 1221 to the second FTL core 1222, as indicated in FIG. 7B by the bits LBA04 (corresponding to the LBA group having the LBA group address of 04) and LBA07 (corresponding to the LBA group having the LBA group address of 07) to '1' (indicated by LBA04 and LBA07 being clear).

In addition, the LBA allocation control operation moved data associated with the re-allocated LBAs from where it had been stored in one or more memories associated with the first FTL core 1221 to one or more memories associated with the second FTL core 1222. The storage spaces where the data had been stored in the one or more memories associated with the first FTL core 1221 may be marked as invalid and queued for erasure.

The example shown in FIGS. 7A and 7B is for two FTL cores, but embodiments are not limited thereto. In an embodiment having three or more FTL cores, the LBA allocation bitmap 700 would include two or more bits for each LBA group to indicate which FTL core the LBA group is allocated to.

Figure 8:
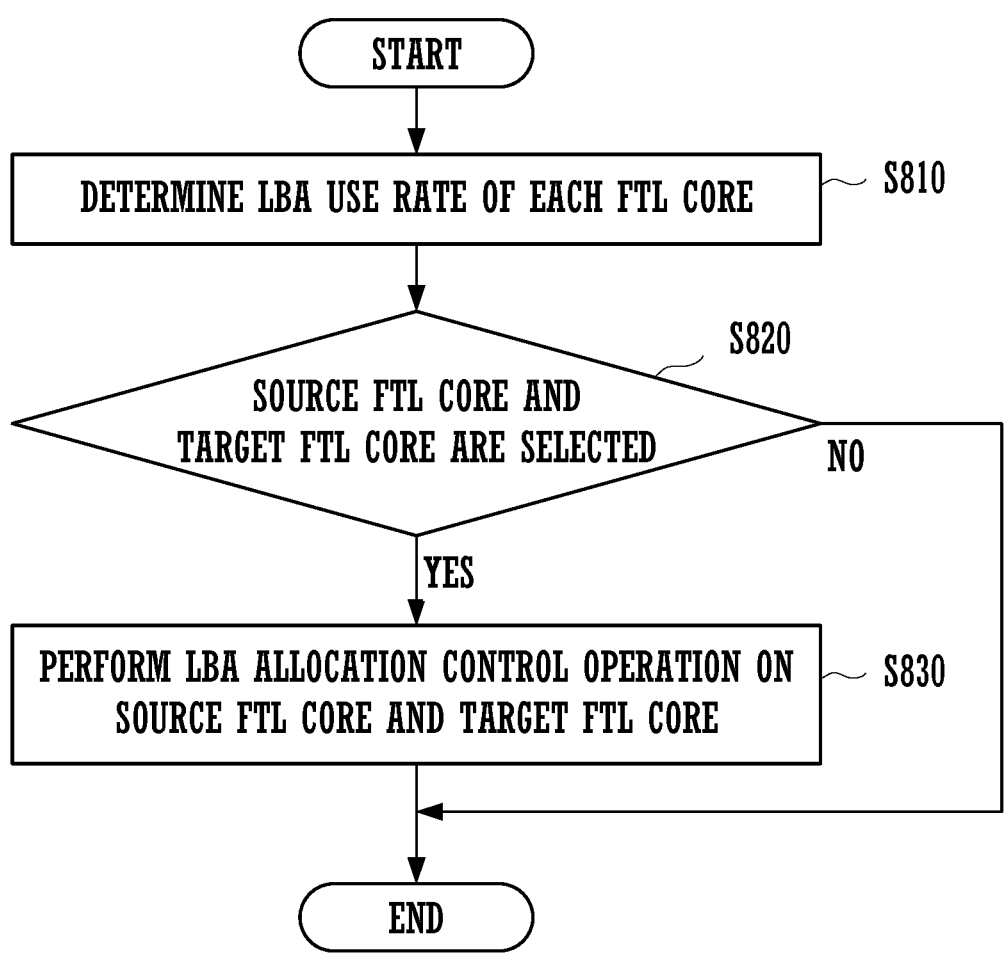
FIG. 8 is a flowchart for describing a method of operating a memory system in accordance with an embodiment of the present disclosure.
Figure 9A:
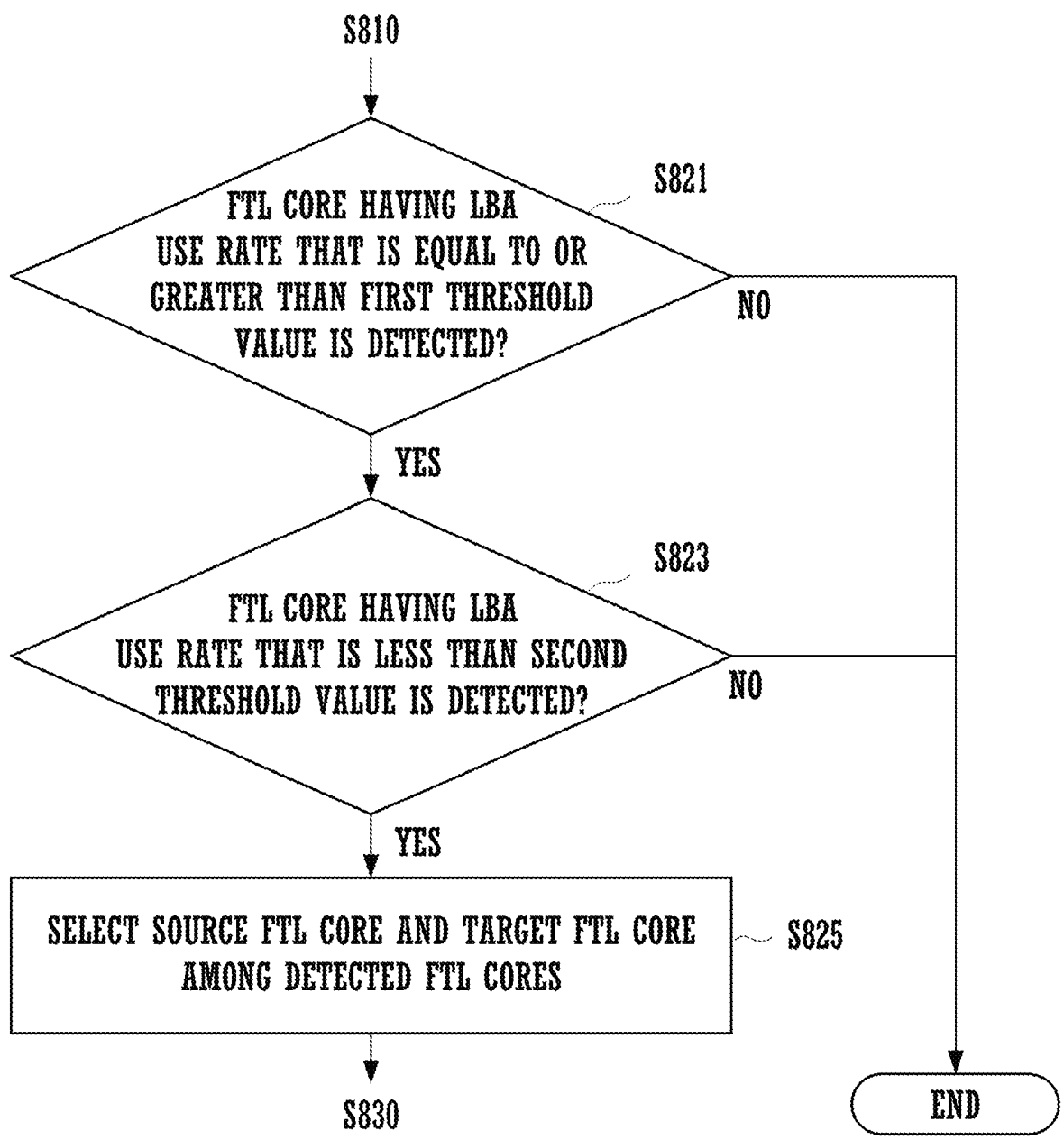
FIGS. 9A, 9B, and 9C are flowcharts for describing a detailed operation of step S820 of FIG. 8 in accordance with embodiments of the present disclosure.
Figure 9B:
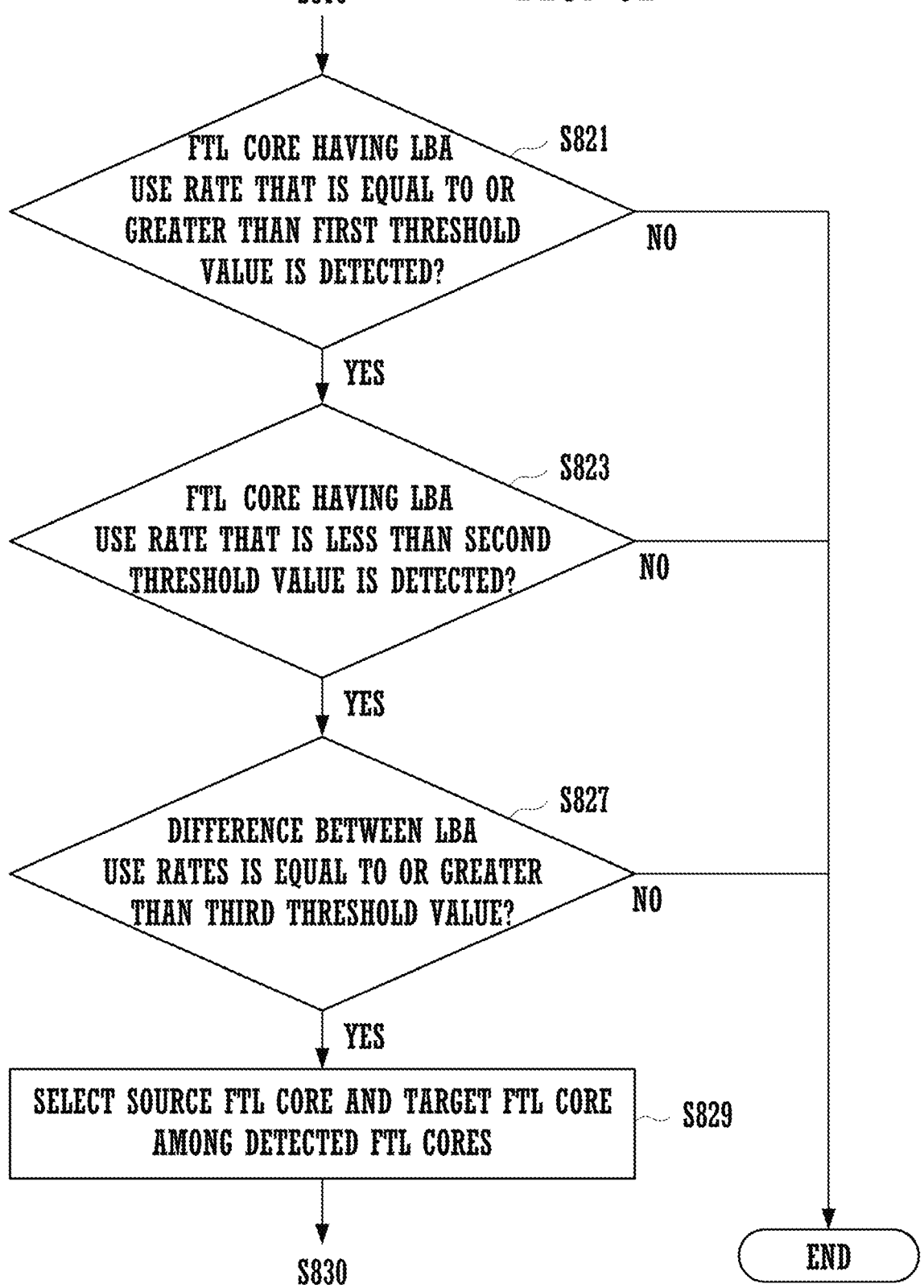
Figure 9C:
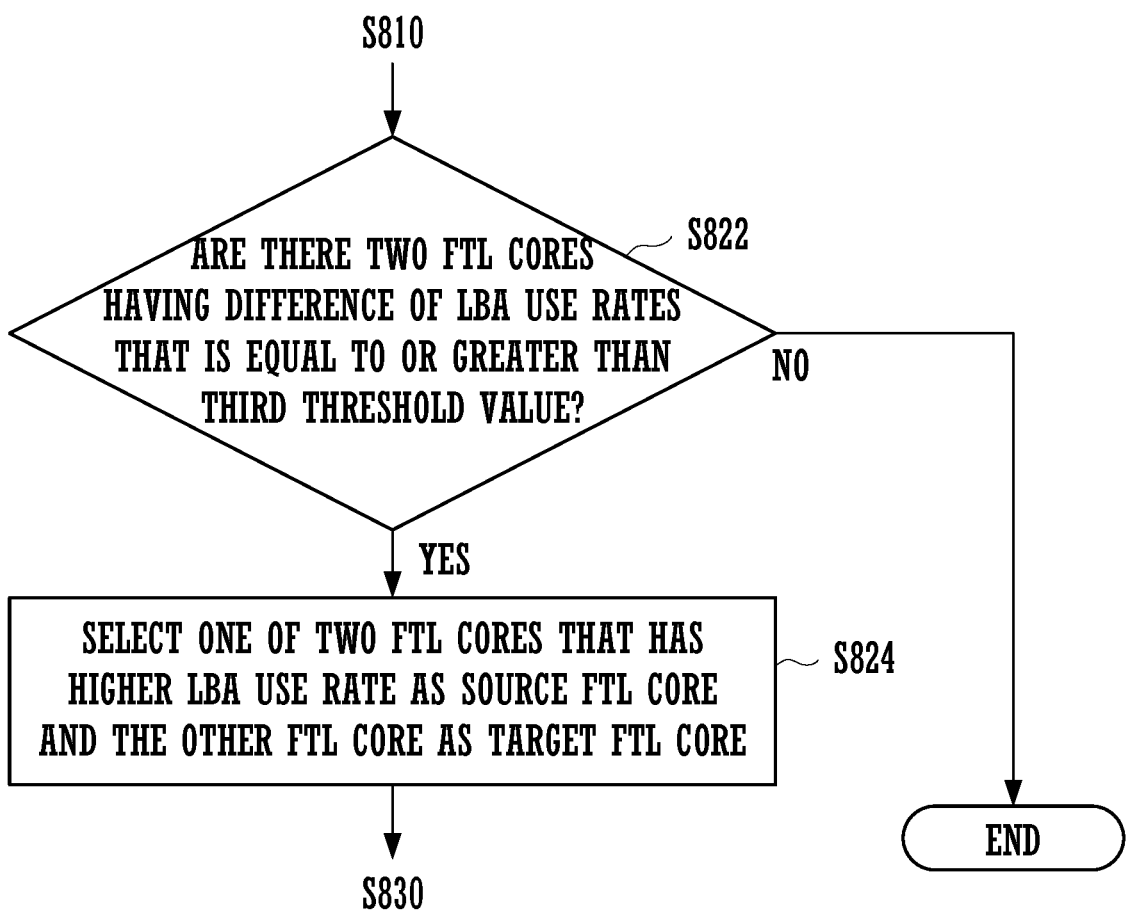
Figure 10:
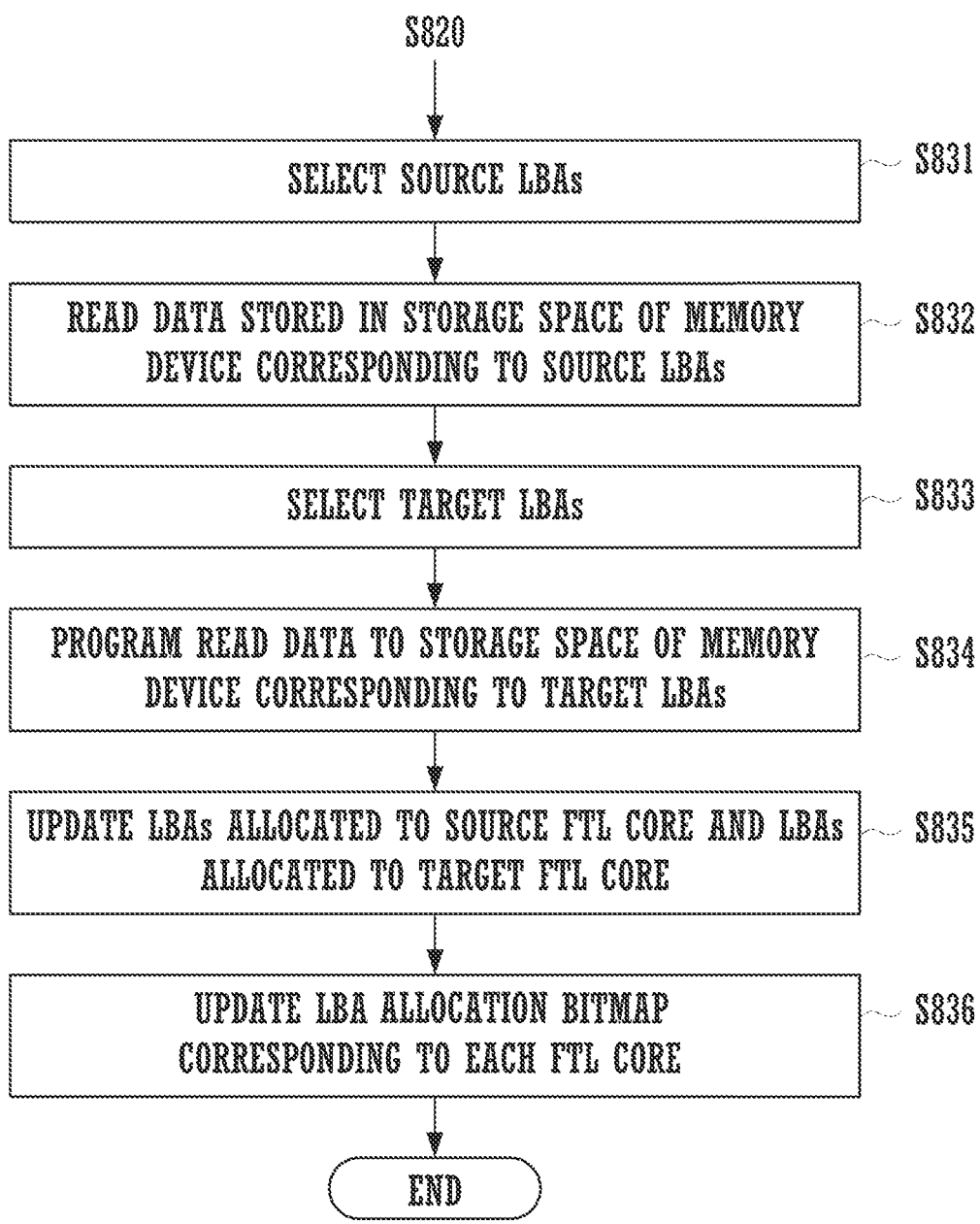
FIG. 10 is a flowchart for describing a detailed operation of step S830 of FIG. 8 in accordance with an embodiment of the present disclosure.

FIG. 8 is a flowchart for describing the LBA allocation control operation of the memory system 1000 of FIG. 1 in accordance with an embodiment of the present disclosure. FIGS. 9A, 9B, and 9C are flowcharts for describing a detailed operation of step S820 of FIG. 8 in accordance with embodiments of the present disclosure. FIG. 10 is a flowchart for describing a detailed operation of step S830 of FIG. 8 in accordance with an embodiment of the present disclosure. The LBA allocation control operation will be described in detail with reference to related drawings.

For illustrative convenience, it is assumed that the processor 1220 includes two FTL cores, e.g., the first FTL core 1221 and the second FTL cores 1222 as shown in FIG. 3, and that the numbers of LBAs or LBA groups allocated to the respective FTL cores during an initial operation (e.g., immediately after product production) of the memory system 1000 are equal to each other.

At S810, the LBA use rate checker 1262 of FIG. 4 checks the LBA allocation bitmaps corresponding to the first FTL core 1221 and the second FTL core 1222 that are stored in the LBA core allocation map unit 1261 of FIG. 4, and determines LBA use rates of the first FTL core 1221 and the second FTL core 1222. This operation of the LBA use rate checker 1262 may be performed periodically during an operation of the memory system 1000, or may be performed in response to a request of the host 1400.

At S820, the LBA allocation controller 1263 of FIG. 4 selects a source FTL core and a target FTL core based on the determined LBA use rates. If the LBA allocation controller 1263 fails to select the source FTL core and the target FTL core at S820, the LBA allocation control operation ends. On the other hand, if the LBA allocation controller 1263 selects the source FTL core and the target FTL core, the LBA allocation control operation proceeds to S830. The detailed operations of step S820 will be described hereinafter with reference to FIGS. 9A, 9B, and 9C.

Referring to FIG. 9A, at S821, the LBA allocation controller 1263 compares the LBA use rates determined by the LBA use rate checker 1262 with a first threshold value and a second threshold value that is smaller than the first threshold value, and detects an FTL core having an LBA use rate that is equal to or greater than the first threshold value. If the FTL core having the LBA use rate that is equal to or greater than the first threshold value is not detected, the LBA allocation control operation ends.

On the other hand, if the LBA allocation controller 1263 detects the FTL core having the LBA use rate that is equal to or greater than the first threshold value at S821, the LBA allocation controller 1263 detects an FTL core having an LBA use rate that is less than the second threshold value at S823. If the LBA allocation controller 1263 does not detect the FTL core having the LBA use rate that is less than the second threshold value, the LBA allocation control operation ends.

On the other hand, if the LBA allocation controller 1263 detects the FTL core having the LBA use rate that is less than the second threshold value at S823, the LBA allocation controller 1263 selects, as the source FTL core, the FTL core having the LBA use rate that is equal to or greater than the first threshold value, and selects, as the target FTL core, the FTL core having the LBA use rate that is less than the second threshold value, at S825. After that, the LBA allocation control operation proceeds to S830.

In an embodiment, at S821, if two or more FTL cores each having an LBA use rate that is equal to or greater than the first threshold value are detected, an FTL core having a higher LBA use rate, among the two or more FTL cores, is selected as the source FTL core at S825. At S823, if two or more FTL cores each having an LBA use rate that is less than the second threshold value are detected, an FTL core having a lower LBA use rate, among the two or more FT cores, is selected as the target FTL core at S825. However, embodiments are not limited thereto.

Referring to FIG. 9B, after the LBA allocation controller 1263 detects the FTL core having the LBA use rate that is equal to or greater than the first threshold value at S821 and the FTL core having the LBA use rate that is less than the second threshold value at S823 as described with reference to FIG. 9A, the LBA allocation controller 1263 compares a difference of the LBA use rates of the detected two FTL cores with a third threshold value at S827. As a result of the comparison, if the difference is less than the third threshold value, the LBA allocation control operation ends. In an embodiment, the third threshold value is greater than a difference between the first and second threshold values.

On the other hand, if the difference is equal to or greater than the third threshold value, the FTL core having the LBA use rate equal to or greater than the first threshold value is selected as the source FTL core, and the FTL core having the LBA use rate less than the second threshold value is selected as the target FTL core, at S829. After that, the LBA allocation control operation proceeds to S830.

In an embodiment, if two or more FTL cores each having a LBA use rate that is equal to or greater than the first threshold value are detected at S821 and/or if two or more FTL cores each having a LBA use rate that is less than the second threshold value are detected at S823, an FTL core of the two or more FTL cores each having a LBA use rate that is equal to or greater than the first threshold value, having a higher LBA use rate and/or an FTL core of the two or mroe FTL cores each having a LBA use rate that is less than the second threshold value, having a lower LBA use rate are selected to perform the operation at S827. However, embodiments are not limited thereto.

Referring to FIG. 9C, at S822, the LBA allocation controller 1263 compares the LBA use rates calculated by the LBA use rate checker 1262 with each other, and detects any two FTL cores having a difference of the LBA use rates thereof that is equal to or greater than a third threshold value. If there are no two FTL cores having the difference of the LBA use rates thereof that is equal to or greater than the third threshold value, the LBA allocation control operation ends.

On the other hand, if there are the two FTL cores having the difference of the LBA use rates thereof that is equal to or greater than the third threshold value, at S824, one of the two FTL cores, which has a higher LBA use rate, is selected as the source FTL core, and the other one of the two FTL cores, which has a lower LBA use rate, is selected as the target FTL core. After that, the LBA allocation control operation proceeds to S830.

Referring to FIGS. 5 and 9A, when the first threshold value is 70 and the second threshold value is 30, the first FTL core 1221 can be selected as the source FTL core, and the second FTL core 1222 can be selected as the target FTL core. In addition, referring to FIG. 5 and FIG. 9B or 9C, when the third threshold value is 40, the first FTL core 1221 can be selected as the source FTL core, and the second FTL core 1222 can be selected as the target FTL core.

Referring back to FIG. 8, after the LBA allocation controller 1263 selects the source FTL core and the target FTL core as described above with reference to FIGS. 9A, 9B, and 9C, at S830, the LBA allocating controller 1263 performs the LBA allocation control operation on the source FTL core and the target FTL core.

In particular, the LBA allocating controller 1263 moves data stored in storage spaces corresponding to selected used LBAs of the source FTL core to storage spaces corresponding to selected unused LBAs of the target FTL core. The detailed operation of step S830 will be described hereinafter with reference to FIG. 10.

Referring to FIG. 10, at S831, the LBA allocation controller 1263 selects a portion of used LBAs of the source FTL core. The selected used LBAs may be referred to as 'source LBAs.' For example, referring to FIGS. 6A and 6B, when the first FTL core 1221 and the second FTL core 1222 are selected as the source FTL core and the target FTL core, respectively, the $6^{th}$ to $8^{th}$ LBAs of the first FTL core 1221 are selected as the source LBAs.

At S832, the LBA allocation controller 1263 controls the flash controller 1230 to read data stored in storage spaces of the memory device 1100 that correspond to the source LBAs. The read data may be temporarily stored in the read buffer 1243 of the buffer memory 1240 of FIG. 3. For example, referring to FIGS. 6A and 6B, the LBA allocation controller 1263 controls the flash controller 1230 to read data stored in storage spaces of the memory device 1100 that corresponds to the $6^{th}$ to $8^{th}$ PBAs mapped to the $6^{th}$ to $8^{th}$ LBAs that are selected as the source LBAs.

At S833, the LBA allocation controller 1263 selects a portion of unused LBAs of the target FTL core. The selected unused LBAs may be referred to as 'target LBAs.' For example, referring to FIGS. 6A and 6B, the $13^{th}$ to $15^{th}$ LBAs of the second FTL core 1222 are selected as the target LBAs.

At S834, the LBA allocation controller 1263 controls the flash controller 1230 to move the data stored in the read buffer 1243 to storage spaces of the memory device 1100 that correspond to the target LBAs. For example, referring to FIGS. 6A and 6B, the LBA allocation controller 1263 controls the flash controller 1230 to program the data stored in the read buffer 1243 to storage spaces of the memory device 1100 that correspond to the $13^{th}$ to $15^{th}$ PBAs mapped to the $13^{th}$ to 15th LBAs that are selected as the target LBAs.

At S835, the LBAs allocated to the source FTL core and the LBAs allocated to the target FTL core are updated using the target LBAs and the source LBAs. In an embodiment, the source LBAs are re-allocated to the target FTL core, and the target LBAs are re-allocated to the source FTL core, such that the number of LBAs allocated to the source FTL core and the number of LBAs allocated to the target FTL core remain equal to each other. For example, referring to FIGS. 6A and 6B, the $6^{th}$ to $8^{th}$ LBAs are re-allocated to the second FTL core 1222, and the $13^{th}$ to $15^{th}$ LBAs are re-allocated to the first FTL core 1221.

At S836, the LBA allocation controller 1263 controls the LBA core allocation map unit 1261 to update the allocation bitmaps with the re-allocated source and target LBAs, such that the LBA use rates of the source and target FTL cores are controlled to be equal to each other. For example, referring to FIGS. 5, 6A, and 6B, the allocation bitmaps are updated with bit values of the re-allocated source and target LBAs. Thus, after the LBA allocation control operation is performed, the first FTL core 1221 and the second FTL core 1222 have the same LBA use rate, i.e., 50%.

In an embodiment, the LBA allocation controller 1263 may further update the LBA information stored therein based on the result of the LBA allocation control operation. The LBA information may include LBAs allocated to each FTL core. For example, referring to FIGS. 6A and 6B, the LBA information for the first FTL core 1221 is updated from '1-10' to '1-5, 13-15, and 9-10.' The LBA information for the second FTL core 1222 is updated from '11-20' to '11-12, 6-8, and 16-20.'

In an embodiment, the LBA allocation controller 1263 may further update the map data stored in the map data storage 1241 of FIG. 3 based on the result of the LBA allocation control operation.

Figure 11:
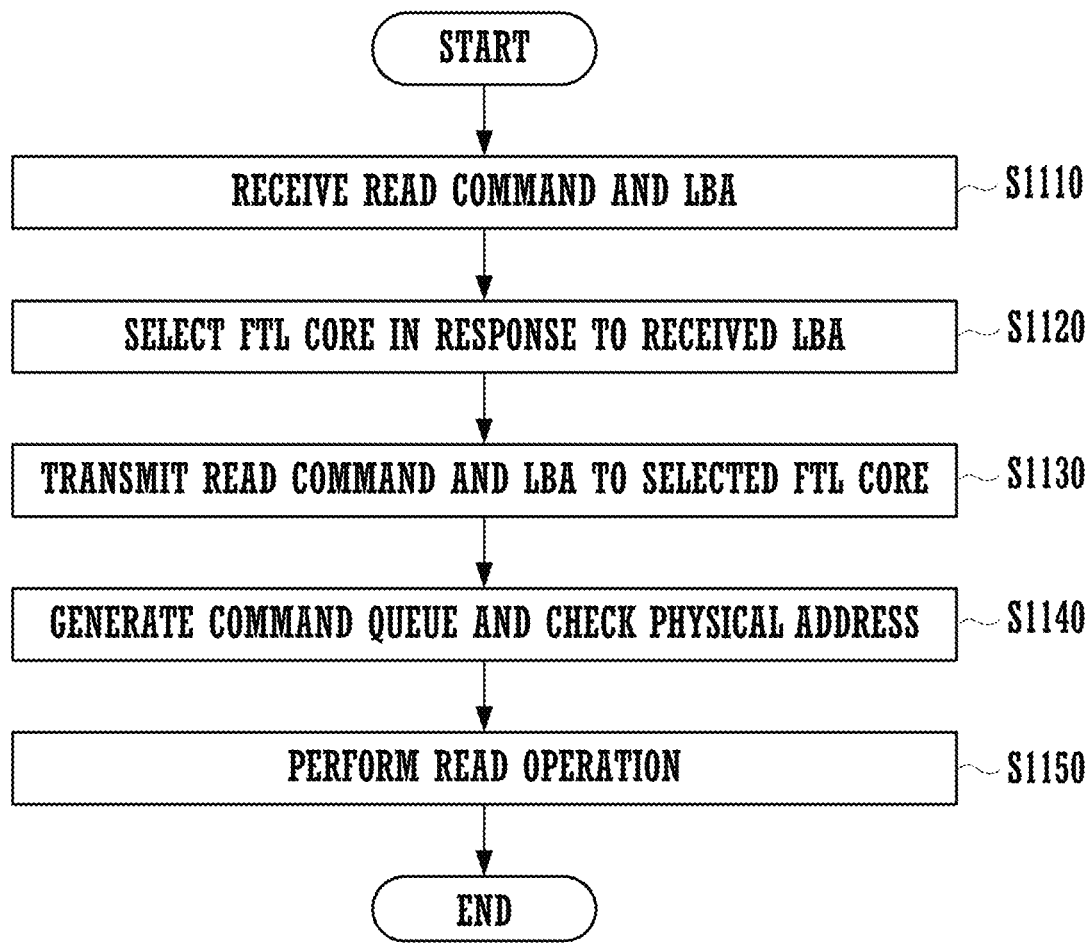
FIG. 11 is a flowchart for describing a read operation in accordance with an embodiment of the present disclosure.

FIG. 11 is a flowchart of a method of performing a read operation of the memory system 1000 of FIG. 1 in accordance with an embodiment of the present disclosure. The read operation will be described with reference to FIGS. 1, 3, and 4.

When a read command corresponding to the read operation and an LBA are received from the host 1400 through the host interface 1210 at S1110, the resource controller 1260 selects an FTL core to which the received LBA is allocated at S1120. For example, the resource controller 1260 of FIG. 3 may select the FTL core to which the received LBA is allocated, with reference to the LBA information stored in the LBA allocation controller 1263 or to the LBA allocation bitmap of FIG. 7B according to an embodiment.

At S1130, the resource controller 1260 transmits the received read command and the received LBA to the selected FTL core, e.g., the first FTL core 1221.

At S1140, the first FTL core 1221 generates a command queue in response to the received read command, and checks a physical address mapped to the received LBA.

At S1150, the flash controller 1230 of FIG. 3 controls the memory device 1100 of FIG. 1 to read data stored in a selected storage space of the memory device 1100 in response to the command queue and the physical address, and stores the read data in the read buffer 1243 of the buffer memory 1240 of FIG. 3. After that, the host interface 1210 of FIG. 3 may transmit the data stored in the read buffer 1243 to the host 1400 of FIG. 1, thus completing the read operation.

Figure 12:
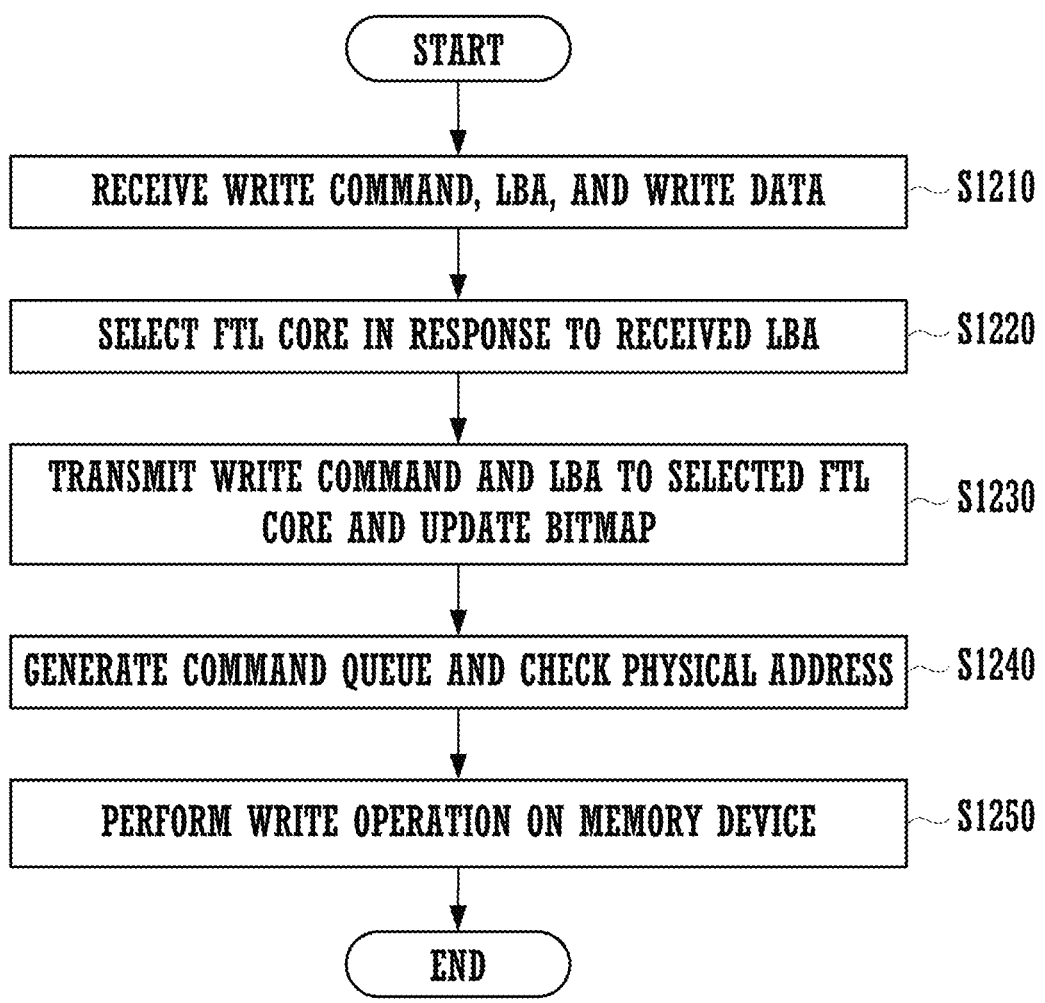
FIG. 12 is a flowchart for describing a write operation in accordance with an embodiment of the present disclosure.

FIG. 12 is a flowchart of a method of performing a write operation of the memory system 1000 of FIG. 1 in accordance with an embodiment of the present disclosure. The write operation will be described with reference to FIGS. 1, 3, and 4.

When a write command corresponding to the write operation, an LBA, and write data are received from the host 1400 of FIG. 1 through the host interface 1210 at S1210, the resource controller 1260 of FIG. 3 stores the write data in the write buffer 1242 and selects an FTL core to which the received LBA is allocated at S1220. For example, the resource controller 1260 may select the FTL core to which the received LBA is allocated, with reference to the LBA information stored in the LBA allocation controller 1263 or to the LBA allocation bitmap of FIG. 7B according to an embodiment.

At S1230, the resource controller 1260 transmits the received write command and the received LBA to the selected FTL core, e.g., the first FTL core 1221. After that, in an embodiment, the resource controller 1260 may control the LBA core allocation map unit 1261 to update the allocation bitmap corresponding to the first FTL core 1221. For example, in the allocation bitmap illustrated in FIG. 5, a bit value of the receive LBA is updated to a bit value '1' representing that the received LBA has been used.

At S1240, the first FTL core 1221 generates a command queue in response to the received write command, and checks a physical address mapped to the received LBA.

At S1250, the memory device 1100 of FIG. 1 controls the flash controller 1230 to program the write data, which is stored in the write buffer 1242, to a selected storage space of the memory device 1100 in response to the command queue and the physical address.

In various embodiments of the present disclosure, in the memory system 1000 including the plurality of FTL cores, used logical addresses may be uniformly re-allocated to the FTL cores based on use rates of logical addresses allocated to the FTL cores. Therefore, the FTL cores may uniformly operate, and it is possible to improve the performance of the memory system 1000.

In addition, in embodiments where a plurality of FTL cores can operate independently and simultaneously, balancing the allocation of used LBAs among the plurality of FTL cores may improve the performance of the memory system 1000 by increasing the probability of more than one of the FTL cores being called on to operate at the same time. Furthermore, in embodiments wherein each of the plurality of FTL cores controls the operations over a respective channel group of the first to n-th channels CH1 to CHn, balancing the allocation of used LBAs among the FTL cores may equalize wear of memory devices attached to each channel group with respect to memory devices attached to the other channel group by more equally spreading the operations of the memory system across the first to n-th channels CH1 to CHn.

Figure 13:
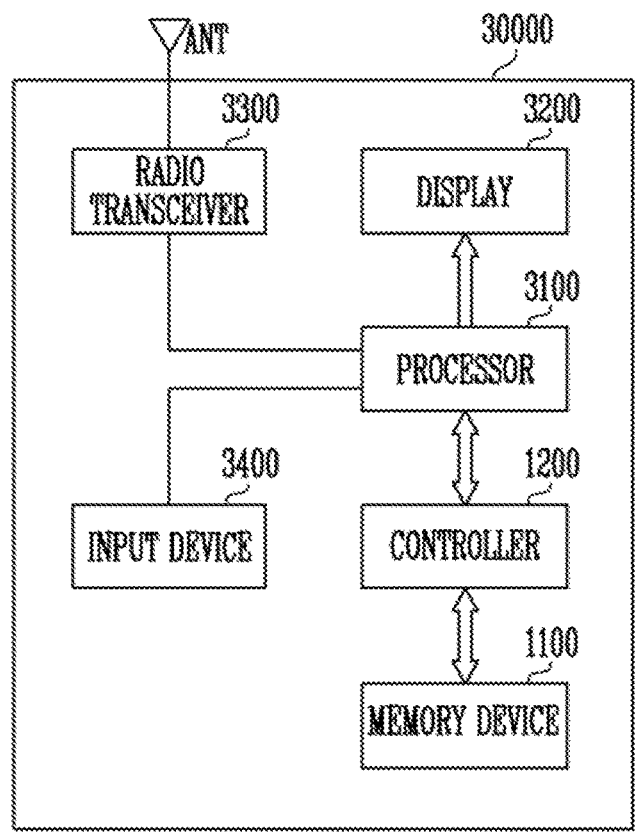
FIG. 13 illustrates a memory system in accordance with an embodiment of the present disclosure.

FIG. 13 is a diagram illustrating a memory system 30000 in accordance with an embodiment of the present disclosure.

Referring to FIG. 13, the memory system 30000 may be embodied in a cellular phone, a smartphone, a tablet PC, a personal digital assistant (PDA) or a wireless communication device. The memory system 30000 may include a memory device 1100, and a controller 1200 capable of controlling the operation of the memory device 1100. The controller 1200 may control a data access operation, e.g., a program operation, an erase operation, or a read operation, of the memory device 1100 under control of a processor 3100.

Data programmed to the memory device 1100 may be output through a display 3200 under control of the controller 1200.

A radio transceiver 3300 may send and receive radio signals through an antenna ANT. For example, the radio transceiver 3300 may change a radio signal received through the antenna ANT into a signal capable of being processed in the processor 3100. Therefore, the processor 3100 may process a signal output from the radio transceiver 3300 and transmit the processed signal to the controller 1200 or the display 3200. The controller 1200 may program a signal processed by the processor 3100 to the memory device 1100. Furthermore, the radio transceiver 3300 may change a signal output from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data output from the memory controller 1200, data output from the radio transceiver 3300, or data output form the input device 3400 is output through the display 3200.

In an embodiment, the controller 1200 capable of controlling the operation of the memory device 1100 may be embodied as a part of the processor 3100 or a chip provided separately from the processor 3100. Alternatively, the controller 1200 may be embodied by an example of the controller shown in FIG. 3.

Figure 14:
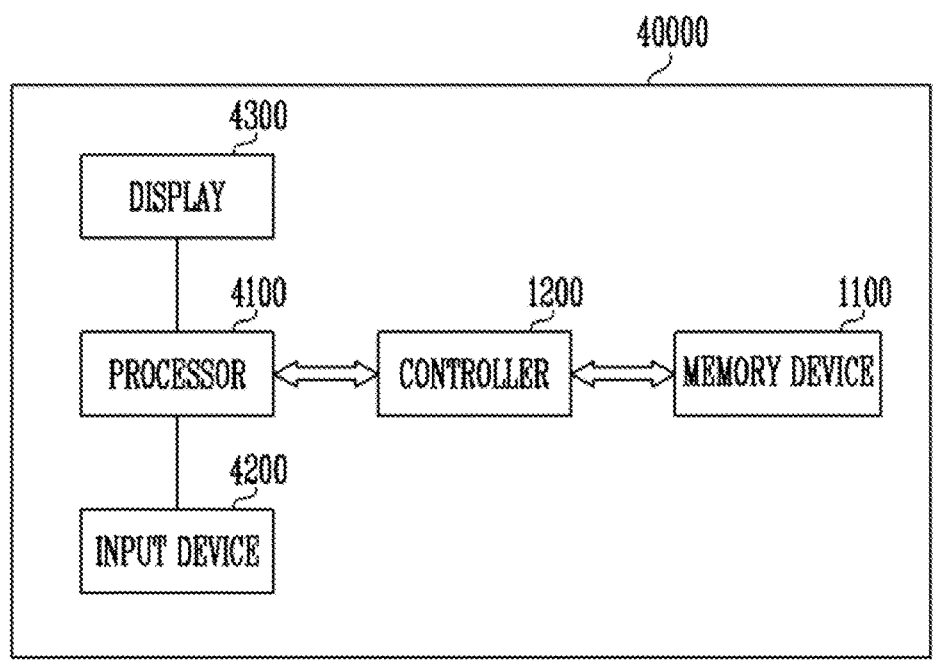
FIG. 14 illustrates a memory system in accordance with an embodiment of the present disclosure.

FIG. 14 is a diagram illustrating a memory system 40000 in accordance with an embodiment of the present disclosure.

Referring to FIG. 14, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include a memory device 1100, and a controller 1200 capable of controlling a data processing operation of the memory device 1100.

A processor 4100 may output data stored in the memory device 1100 through a display 4300, according to data input from an input device 4200. For example, the input device 4200 may be embodied in a pointing device such as a touch pad or a computer mouse, a keypad, or a keyboard.

The processor 4100 may control the overall operation of the memory system 40000 and control the operation of the controller 1200. In an embodiment, the controller 1200 capable of controlling the operation of the memory device 1100 may be embodied as a part of the processor 4100 or a chip provided separately from the processor 4100. Alternatively, the controller 1200 may be embodied by an example of the controller shown in FIG. 3.

Figure 15:
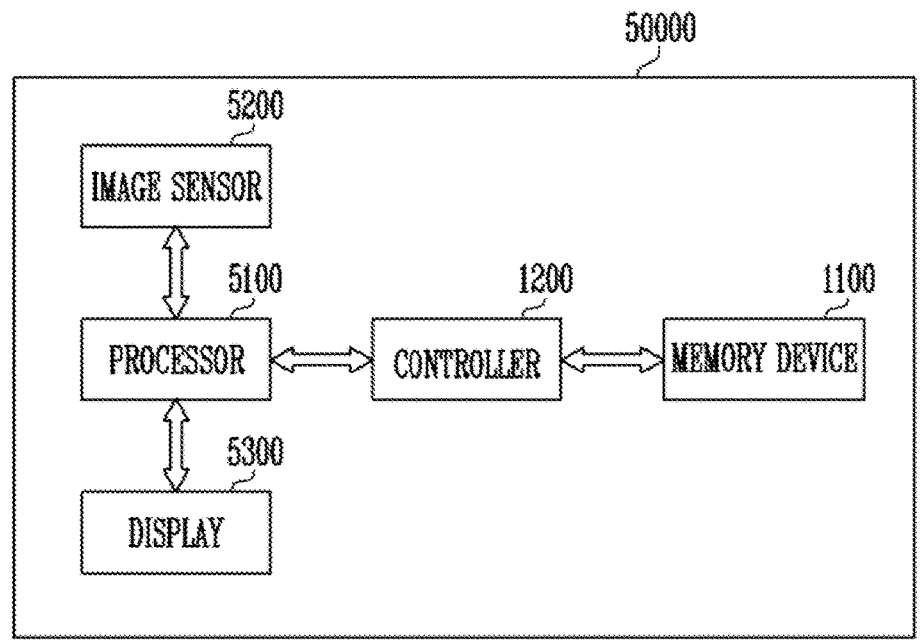
FIG. 15 illustrates a memory system in accordance with an embodiment of the present disclosure.

FIG. 15 is a diagram illustrating a memory system 50000 in accordance with an embodiment of the present disclosure.

Referring to FIG. 15, the memory system 50000 may be embodied in an image processing device, e.g., a digital camera, a portable phone provided with a digital camera, a smartphone provided with a digital camera, or a tablet PC provided with a digital camera.

The memory system 50000 may include a memory device 1100, and a controller 1200 capable of controlling a data processing operation, e.g., a program operation, an erase operation, or a read operation, of the memory device 1100.

An image sensor 5200 of the memory system 50000 may convert an optical image into digital signals. The converted digital signals may be transmitted to a processor 5100 or the controller 1200. Under control of the processor 5100, the converted digital signals may be output through a display 5300 or stored to the memory device 1100 through the controller 1200. Data stored in the memory device 1100 may be output through the display 5300 under control of the processor 5100 or the controller 1200.

In an embodiment, the controller 1200 capable of controlling the operation of the memory device 1100 may be embodied as a part of the processor 5100 or a chip provided separately from the processor 5100. Alternatively, the controller 1200 may be embodied by an example of the controller shown in FIG. 3.

Figure 16:
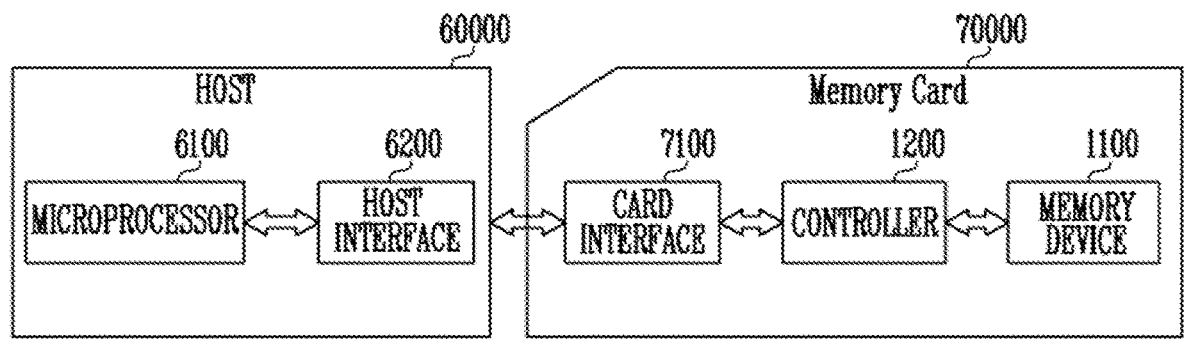
FIG. 16 illustrates a memory system in accordance with an embodiment of the present disclosure.

FIG. 16 is a diagram illustrating a memory system 70000 in accordance with an embodiment of the present disclosure.

Referring to FIG. 16, the memory system 70000 may be embodied in a memory card or a smart card. The memory system 70000 may include a memory device 1100, a controller 1200, and a card interface 7100.

The controller 1200 may control data exchange between the memory device 1100 and the card interface 7100. In an embodiment, the card interface 7100 may be a secure digital (SD) card interface or a multi-media card (MMC) interface, but it is not limited thereto. The controller 1200 may be embodied by an example of the controller 1200 shown in FIG. 3.

The card interface 7100 may interface data exchange between a host 60000 and the controller 1200 according to a protocol of the host 60000. In an embodiment, the card interface 7100 may support a universal serial bus (USB) protocol, and an interchip (IC)-USB protocol. Here, the card interface may refer to hardware capable of supporting a protocol which is used by the host 60000, software installed in the hardware, or a signal transmission scheme.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 1100 through the card interface 7100 and the controller 1200 under control of a microprocessor 6100.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not be always performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory system comprising:
   a memory device comprising first and second memory groups; and
   a controller including a resource controller and first and second flash translation layer (FTL) cores, each of the first and second FTL cores managing a plurality of logical addresses (LAs) that are mapped, respectively, to a plurality of physical addresses (PAs) of a corresponding memory group,
   wherein the resource controller is configured to:
   determine LA use rates of the first and second FTL cores;
   select a source FTL core and a target FTL core from the first and second FTL cores using the LA use rates; and
   balance the LA use rates of the source FTL core and the target FTL core by moving data stored in storage spaces associated with a portion of the LAs from the source FTL core to storage spaces associated with the target FTL core.

2. The memory system of claim 1, wherein moving the data comprises:
   selecting a portion of used LAs of the source FTL core as source LAs and a portion of unused LAs of the target FTL core as target LAs;
   moving data stored in storage spaces of a memory group associated with the source LAs to storage spaces of a memory group associated with the target LAs; and
   re-allocating the source LAs and the target LAs to the target FTL core and the source FTL core, respectively.

3. The memory system of claim 1, wherein the resource controller comprises:
   an LA core allocation map unit configured to store and manage information indicating the LAs allocated to the first and second FTL cores;
   an LA use rate checker configured to determine the LA use rates of the first and second FTL cores based on the information indicating the LAs; and
   an LA allocation controller configured to select the source FTL core and the target FTL core and move the portion of the LAs from the source FTL core to the target FTL core.

4. The memory system of claim 3, wherein the LA allocation controller is configured to:
   compare the LA use rates of the first and second FTL cores with a first threshold value and a second threshold value that is smaller than the first threshold value;
   select the first FTL core as the source FTL core when the LA use rate of the first FTL core is equal to or greater than the first threshold value; and
   select the second FTL core as the target FTL core when the LA use rate of the second FTL core is less than the second threshold value.

5. The memory system of claim 3, wherein the LA allocation controller is configured to:
   compare the LA use rates of the first and second FTL cores with a first threshold value and a second threshold value that is smaller than the first threshold value;
   compare a difference between the LA use rates with a third threshold value that is greater than a difference between the first and second threshold values; and
   select one of the first and second FTL cores that has a higher LA use rate as the source FTL core and the other of the first and second FTL cores that has a lower LA use rate as the target FTL core, when the difference is equal to or greater than the third threshold value.

6. The memory system of claim 3, wherein the controller includes three or more FTL cores including the first and second FTL cores, the LA allocation controller is configured to:
   select two FTL cores having a difference between LA use rates that is equal to or greater than a threshold value, from among the plurality of FTL cores; and
   select one of the two FTL cores with a higher LA use rate as the source FTL core and the other with a lower LA use rate as the target FTL core.

7. The memory system of claim 3, wherein the LA allocation controller is further configured to, after moving the portion of the LAs from the source FTL core to the target FTL core, update the information indicating the LAs allocated to the first and second FTL cores based on a result of the re-allocating.

8. The memory system of claim 3, wherein the information indicating the LAs includes first and second bitmaps respectively corresponding to the first and second FTL cores, each of the first and second bitmaps having one-bit data for each of the LAs allocated to a corresponding one of the first and second FTL cores, the one-bit data representing whether said each of the LAs is used or not.

9. The memory system of claim 3, wherein the information indicating the LAs includes a bitmap that includes one or more bits for each LA, the one or more bits indicating which of the first and second FTL cores corresponds to the LA.

10. A controller, comprising:
   a plurality of FTL cores, each of the plurality of FTL cores managing a plurality of logical addresses (LAs) that are mapped, respectively, to a plurality of physical addresses (PAs); and
   a resource controller configured to determine LA use rates of the plurality of FTL cores, select a source FTL core and a target FTL core from the plurality of FTL cores based on the LA use rates, and perform an LA allocation control operation on the source FTL core and the target FTL core so that the LA use rates of the source FTL core and the target FTL core are balanced.

11. The controller of claim 10, wherein the source and target FTL cores are selected by comparing the LA use rates of the plurality of FTL cores with a first threshold value and a second threshold value that is smaller than the first threshold value.

12. The controller of claim 10, wherein the source and target FTL cores are selected by comparing a difference between LA use rates of any two FTL cores of the plurality of FTL cores with a threshold value.

13. The controller of claim 10, wherein the resource controller is configured to, after the source and target FTL cores are selected:
   select a portion of used LAs of the source FTL core as source LAs and a portion of unused LAs of the target FTL core as target LAs;
   move data stored in storage spaces associated with the source LAs to storage spaces associated with the target LAs; and
   re-allocate the source LAs and the target LAs to the target FTL core and the source FTL core, respectively.

14. A method for operating a memory system, the method comprising:
   determining LA use rates of a plurality of FTL cores, each of the plurality of FTL cores managing a plurality of logical addresses (LAs) that are mapped, respectively, to a plurality of physical addresses (PAs) of a memory device;
   selecting a source FTL core and a target FTL core from the plurality of FTL cores based on the LA use rates; and
   balancing the LA use rates of the source FTL core and the target FTL core.

15. The method of claim 14, wherein the LA use rates of the source FTL core and the target FTL core are balanced by moving data stored in storage spaces associated with a portion of the LAs from the source FTL core to storage spaces associated with the target FTL core.

16. The method of claim 15, wherein moving the data comprises:
   selecting a portion of used LAs of the source FTL core as source LAs and a portion of unused LAs of the target FTL core as target LAs;
   moving the data stored in storage spaces associated with the source LAs to storage spaces associated with the target LAs; and
   re-allocating the source LAs and the target LAs to the target FTL core and the source FTL core, respectively.

17. The method of claim 16, wherein determining the LA use rates of the plurality of FTL cores comprises determining the LA use rates using a plurality of bitmaps, respectively, corresponding to the plurality of FTL cores, each of the plurality of bitmaps having one-bit data for each of the LAs allocated to a corresponding one of the plurality of FTL cores, the one-bit data representing whether said each of the LAs is used or not, and
   wherein the method further comprises, updating the bitmaps corresponding to the source and target FTL cores based on a result of the re-allocating.

18. The method of claim 14, wherein selecting the source FTL core and the target FTL core comprises:
   comparing the LA use rates of the plurality of FTL cores with a first threshold value and a second threshold value that is smaller than the first threshold value;
   selecting an FTL core having an LA use rate that is equal to or greater than the first threshold value as the source FTL core; and
   selecting an FTL core having an LA use rate that is less than the second threshold value as the target FTL core.

19. The method of claim 14, wherein selecting the source FTL core and the target FTL core comprises:
   comparing the LA use rates of the plurality of FTL cores with a first threshold value and a second threshold value that is smaller than the first threshold value;
   selecting a first FTL core having an LA use rate that is equal to or greater than the first threshold value;
   selecting a second FTL core having an LA use rate that is less than the second threshold value;
   comparing a difference between the LA use rates of the first and second FTL cores with a third threshold value that is greater than a difference between the first and second threshold values; and
   selecting one of the first and second FTL cores that has a higher LA use rate as the source FTL core and the other that has a lower LA use rate as the target FTL core, when the difference is equal to or greater than the third threshold value.

20. The method of claim 14, wherein selecting the source FTL core and the target FTL core comprises:
   comparing the LA use rates of the plurality of FTL cores with each other;
   selecting two FTL cores having a difference between the LBA use rates of the two FTL cores that is equal to or greater than a threshold value, from the plurality of FTL cores; and
   selecting one of the two FTL cores that has a higher LA use rate as the source FTL core and the other that has a lower LA use rate as the target FTL core.

* * * * *